(12) United States Patent
Makita et al.

(10) Patent No.: US 7,576,466 B2
(45) Date of Patent: Aug. 18, 2009

(54) ELECTRIC MOTOR WITH MINIMIZED COGGING AND RELATED METHOD OF DETERMINING STATOR POLE GEOMETRY

(75) Inventors: Shinji Makita, Kakamigahara (JP); Masayuki Nashiki, Komaki (JP)

(73) Assignee: Denso Corporation, Kariya (JP)

( * ) Notice: Subject to any disclaimer, the term of this patent is extended or adjusted under 35 U.S.C. 154(b) by 377 days.

(21) Appl. No.: 11/411,136

(22) Filed: Apr. 26, 2006

(65) Prior Publication Data

US 2006/0244336 A1 Nov. 2, 2006

(30) Foreign Application Priority Data

Apr. 28, 2005 (JP) .............................. 2005-131813

(51) Int. Cl.
*H02K 1/00* (2006.01)
(52) U.S. Cl. ...................................... 310/216
(58) Field of Classification Search ................. 310/216, 310/51, 67 R, 254, 190, 191, 209
See application file for complete search history.

(56) References Cited

U.S. PATENT DOCUMENTS

| | | | |
|---|---|---|---|
| 4,059,780 A | | 11/1977 | Mazuir |
| 4,488,069 A | * | 12/1984 | Field, II ..................... 310/49 A |
| 5,331,245 A | * | 7/1994 | Burgbacher et al. ......... 310/186 |
| 5,818,143 A | | 10/1998 | Suzuki et al. |
| 6,538,357 B2 | * | 3/2003 | Horng et al. ................ 310/257 |
| 7,105,974 B2 | * | 9/2006 | Nashiki ...................... 310/185 |
| 7,125,802 B2 | * | 10/2006 | Wang et al. ................. 438/692 |
| 7,135,802 B2 | * | 11/2006 | Seki et al. ................... 310/257 |

| | | |
|---|---|---|
| 2001/0048264 A1 | 12/2001 | Trago et al. |

(Continued)

FOREIGN PATENT DOCUMENTS

DE 41 24 425 A1 1/1992

(Continued)

OTHER PUBLICATIONS

Zhu, Z.Q. et al.; "Influence of Design Parameters on Cogging Torque in permanent Magnet Machines;" *IIEE Transactions on Energy Conversion*; vol. 15; No. 4; Dec. 2000; pp. 407-412.

(Continued)

*Primary Examiner*—Javaid Nasri
(74) *Attorney, Agent, or Firm*—Oliff & Berridge, PLC

(57) ABSTRACT

An electric motor with reduced cogging torque and related method of determining a stator pole geometry are disclosed. The electric motor includes a rotor (80, 91, 96) and a stator (50A, 50B, 50C, 50D, 60A, 60B, 60C, 60D, 70A, 90B, 94B, 98) having a stator pole geometry incorporating non-magnetic body segments (110) and magnetic body segments (100) as magnetic reluctance equalizing elements to provide an equalized magnetic body distribution along a circumferential periphery of the stator. The method comprises defining a first group of stator poles skewed at an electric angle of 360/(2S), defining a second group of stator poles deviated from the first group of stator poles by an electric angle of 180 degrees, and synthesizing the first and second groups of stator poles pieces to provide a stator including a plurality of stator poles defined in the stator pole geometry to have an equalized magnetic flux distribution pattern along a circumferential periphery of the stator.

13 Claims, 14 Drawing Sheets

U.S. PATENT DOCUMENTS

| | | |
|---|---|---|
| 2002/0003382 A1 | 1/2002 | Nakano et al. |
| 2005/0012427 A1 | 1/2005 | Seki et al. |
| 2005/0099082 A1 | 5/2005 | Nashiki |

FOREIGN PATENT DOCUMENTS

| | | |
|---|---|---|
| GB | 2 410 381 A | 7/2005 |
| JP | A-58-222466 | 12/1983 |
| JP | A-11-136893 | 5/1999 |
| JP | A 2005-020981 | 1/2005 |
| JP | A 2005-160285 | 6/2005 |

OTHER PUBLICATIONS

Kazuo Ohnishi, "Cogging Torque Reduction in Permanent Magnet Brushless Motors." T.IEE Japan, vol. 122-D, No. 4, 2002, pp. 338-345.

Office Action mailed Aug. 8, 2008, in Chinese Application No. 200610077464.8, with English translation.

* cited by examiner

ELECTRIC MOTOR WITH MINIMIZED COGGING AND RELATED METHOD OF DETERMINING STATOR POLE GEOMETRY

CROSS REFERENCE TO RELATED APPLICATIONS

This application is related to Japanese Patent Application No. 2005-131813 filed on Apr. 28, 2005, the content of which is hereby incorporated by reference.

BACKGROUND OF THE INVENTION

1. Technical Field of the Invention

The present invention relates to electric motors and, more particularly, to an electric motor with low cogging torque for use in an automobile and a truck or the like and a method of determining a stator pole geometry for controlling cogging torque in the electric motor.

2. Description of the Related Art

As technologies to reduce cogging torque of electric motors in general practice, skewing technique has been explored to reduce cogging torque. Skewing technique features to form stator poles in a skewed pattern such that a stator has rotational positions deviated along an axial direction of a rotor. With such a structure, the stator poles are deviated at an electric angle of 180 degrees to allow the stator to have the same amount of air gap in any rotational positions. In theory, this enables the stator to have a zeroed difference in magnetic reluctance along a circumferential inner periphery of the stator, causing no cogging torque to occur. However, with the skew angle set at too large a value, a drop occurs in utilization efficiency of a magnetic flux of the rotor, resulting in a decrease in output torque. In the case of the stator deviated by 180 degrees, the electric motor generates torque half that of an electric motor with no deviation of the stator poles. Therefore, in actual practice, no attempt is made to deviate the stator poles at the electric angle of 180 degrees; the skew angle is determined so as to cancel a frequency component with maximal cogging torque caused by the stator with no skewing on the stator poles. In such a case, cogging torque cannot be completely removed.

Further, another attempt has been made to reduce cogging torque by additionally forming auxiliary notches as disclosed in T.IEE Japan, Vol. 122-D, No. 4, 2002 on page 338 to 345 entitled "Cogging Torque Reduction in Permanent Magnet Brushless Motors". With such a related art, the auxiliary notches are additionally inserted to positions to cancel variation in magnetic reluctance that occurs in an air gap portion between stator cores.

By the way, with the related art technique of employing added notches as disclosed in the above literature, magnetic reluctances occurring in the air gap segments between the stator cores and the added notches unequally vary with the resultant occurrence of issues wherein the added notches are effective to reduce cogging torque to some extent but have no remarkable effect of completely minimizing cogging torque.

SUMMARY OF THE INVENTION

The present invention has been completed with the above issues in mind and has an object to provide an electric motor, which includes a rotor and a stator having a stator pole geometry to provide an equalized magnetic body distribution pattern over a circumferential periphery of the stator, and a method of determining a stator pole geometry for minimizing cogging torque in the electric motor.

To achieve the above object, one aspect of the present invention provides an electric motor comprising a stator having a circumferential periphery on which a plurality of stator poles are disposed and a rotor rotatable in face-to-face relationship with the stator and having an outer periphery facing the circumferential periphery of the stator. The stator includes magnetic reluctance equalizing means associated with the stator poles, respectively, to minimize a difference in magnetic reluctance along the circumferential periphery of the stator.

With such a structure mentioned above, the stator poles have the magnetic reluctance equalizing elements, respectively, by which the electric motor can be manufactured in a simplified construction with minimized cogging torque. Also, the electric motor can be manufactured with a minimum number component parts at low costs.

With the electric motor of the structure mentioned above, the magnetic reluctance equalizing means may include at least ones of non-magnetic body segments and magnetic body segments.

With such a structure, the magnetic reluctance equalizing means are simple in structure and make it possible to manufacture the electric motor in a simplified construction at low cost.

With the electric motor of the structure mentioned above, the stator poles may be skewed at given angles, respectively, and the magnetic reluctance equalizing means may include non-magnetic body segments partially incorporated in the stator poles, respectively.

With such a structure mentioned above, permitting the stator poles to partially incorporate the non-magnetic body segments, respectively, enables the electric motor to be formed in a simple structure while providing an equalized magnetic reluctance along the circumferential periphery of the stator. This results in remarkable reduction in cogging torque to provide smooth rotation of the motor.

With the electric motor of the structure mentioned above, the stator poles may be skewed at given angles, respectively, and the magnetic reluctance equalizing elements may include magnetic body segments disposed in side areas adjacent to the stator poles, respectively.

With such a structure described above, permitting the stator poles to be associated with the magnetic body segments, respectively, enables the electric motor to be formed in a simple structure while providing an equalized magnetic reluctance along the circumferential periphery of the stator. This remarkably minimizes cogging torque to provide smooth rotation of the motor.

With the electric motor of the structure mentioned above, the stator poles may include nonidentical stator poles arranged in the circumferential periphery of the stator, and the magnetic reluctance equalizing elements may include non-magnetic body segments alternately disposed in axial ends of the stator poles, respectively.

With such a structure set forth above, using the magnetic reluctance equalizing means, composed of the non-magnetic body segments, in combination with the stator poles formed in respective nonidentical configurations provides a stator that has an equalized magnetic reluctance along circumferential periphery of the stator. This results in remarkable reduction in cogging torque even with the stator including the nonidentical stator poles.

With the electric motor of the structure mentioned above, the stator poles may include nonidentical stator poles arranged in the circumferential periphery of the stator and the magnetic reluctance equalizing means may include magnetic body segments alternately disposed in side areas adjacent to axial ends of the stator poles, respectively.

With such a structure discussed above, using the magnetic reluctance equalizing means, composed of the magnetic body segments, in combination with the stator poles formed in respective nonidentical configurations provides a stator that has an equalized magnetic reluctance along circumferential periphery of the stator. This results in a remarkable reduction in cogging torque even with the stator including the nonidentical stator poles.

With the electric motor of the structure mentioned above, the stator poles may include nonidentical stator poles arranged in the circumferential periphery of the stator and the magnetic reluctance equalizing means may include magnetic body segments disposed in a first group of the stator poles, respectively, and non-magnetic body segments disposed in a second group of the stator poles so as to minimize the difference in magnetic reluctance along the circumferential periphery of the stator.

With such a structure set forth above, by incorporating the magnetic reluctance equalizing means, including the magnetic body segments disposed in the first group of the stator poles, respectively, and the non-magnetic body segments disposed in the second group of the stator poles, even the stator composed of the nonidentical stator poles enables to provide equalized magnetic reluctance along the circumferential periphery of the stator. Thus, cogging torque of the electric motor can be remarkably minimized.

With the electric motor of the structure mentioned above, each of the non-magnetic body segments may include an air gap.

Due to the structure of the non-magnetic body segments composed of the air gaps that play a role as the magnetic reluctance equalizing means, a labor hour, for filling non-magnetic material to the non-magnetic body segments, and material for that purpose can be omitted. Thus, the stator can be fabricated in a simple process with an advantageous effect of minimizing cogging torque.

With the electric motor of the structure mentioned above, the number S of phases may be an odd number and the stator and the rotor may have a total skew angle that lies at an electric angle of substantially 360/(2S) degrees.

With such a structure, by setting the total skew angle (or an angle of a pole-to-pole air gap) of the stator and the rotor, the magnetic body distribution ratio along the circumferential periphery of the stator can be substantially equalized. This results in remarkable reduction in cogging torque with the stator in a simplified structure.

With the electric motor of the structure mentioned above, the stator may have the number S of phases is an odd number and the stator has an iron-to-iron air gap equivalent to a value of a case wherein the stator and the rotor has a total skew angle that lies at an electric angle of substantially 360/(2S) degrees.

With such a structure, the stator has an equalized magnetic body distribution ratio with less variation in magnetic reluctance, enabling remarkable reduction on cogging torque.

With the electric motor, the number S of phases may be an odd number and the stator and the rotor may have a total skew angle that lies in a value derived by subtracting an angle corresponding to 0% to 100% of the non-magnetic body segments along the circumferential periphery of the stator from an electric angle of substantially 360/(2S) degrees.

With such a structure mentioned above, the stator has an equalized magnetic body distribution ratio with less variation in magnetic reluctance, enabling remarkable reduction on cogging torque.

With the electric motor, the number S of phases may be an odd number and the stator may have an iron-to-iron air gap equivalent to a value derived by subtracting an angle corresponding to 0% to 100% of the non-magnetic body segments along the circumferential periphery of the stator from an electric angle of substantially 360/(2S) degrees.

With such a structure described above, the stator has an equalized magnetic body distribution ratio with less variation in magnetic reluctance, enabling remarkable reduction on cogging torque.

With the electric motor, the magnetic reluctance equalizing element means may comprise a first group of non-magnetic segments and a second group of non-magnetic segments associated with the stator poles, respectively, at symmetric positions with respect to a center point of the stator.

Such a structure enables the use of a simplified stator structure to achieve remarkable reduction in cogging torque.

With the electric motor, the number S of phases may be an odd number and the stator and the rotor have a total skew angle that lies at an electric angle of substantially 360/(2S) degrees. The magnetic reluctance equalizing element means may comprise non-magnetic segments axially extending through pole-to-pole air gaps adjacent to the stator poles, respectively, each with the substantially same width as the pole-to-pole air gap and at the substantially same skew angle of the stator pole.

With such a structure, the stator can be simplified in structure, enabling remarkable reduction in cogging torque.

According to another aspect of the present invention, there is provided a method of determining a stator pole geometry for minimizing cogging torque in an electric motor, the method comprising defining a stator having a circumferential periphery on which a plurality of stator poles are disposed, defining a rotor rotatably disposed in the stator so as to assume a face-to-face relationship with the stator, and providing magnetic reluctance equalizing elements associated with the stator poles, respectively, to minimize a difference in magnetic reluctance along the circumferential periphery of the stator.

With such a method, the stator of the electric motor can be easily designed to provide the stator defined in a stator pole geometry by which the equalized magnetic body distribution ratio can be obtained along the circumferential periphery of the stator in a simplified step. This results in low cost and easy production of the electric motor while achieving remarkable reduction in cogging torque with the stator in a simplified structure.

The method of determining a stator pole geometry, set forth above, may further comprise placing magnetic reluctance equalizing elements associated with the plurality of stator poles, respectively.

With such a method as mentioned above, using magnetic reluctance equalizing elements in combination with the plurality of stator poles, respectively, results in easy efficient step for determining the stator pole geometry, resulting in reduction of labor hours in designing the stator of the electric motor with the resultant reduction in manufacturing costs.

DETAILED DESCRIPTION OF THE PREFERRED EMBODIMENTS

Now, an electric motor of one embodiment according to the present invention is described below in detail with reference to the accompanying drawings. The electric motor usually undergoes cogging that occurs due to variation in magnetic reluctance depending on the rotation of a rotor in the presence of a differential magnetic reluctance caused by a rotary position of the rotor. First, description is made of a principle in which cogging torque occurs.

Figure 1:
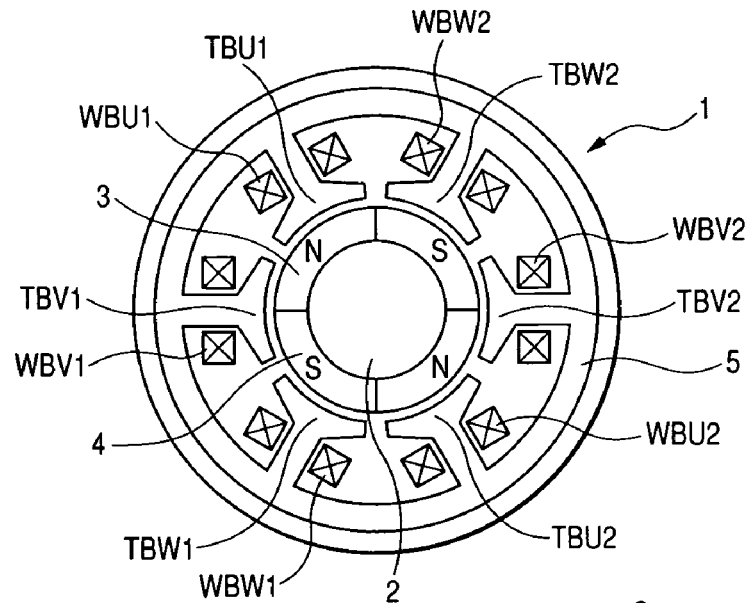
FIG. 1 is a transverse cross-sectional view showing a structure of an electric motor with a three-phase and four-pole in a six-slot type to which the present invention is applied.
Figure 2A:
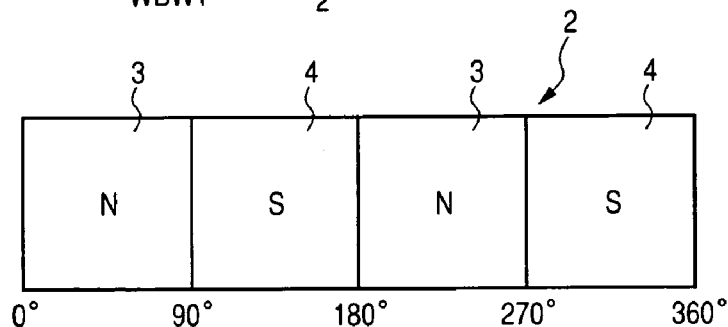
FIG. 2A is a development view of a rotor of the electric motor shown in FIG. 1.
Figure 2B:
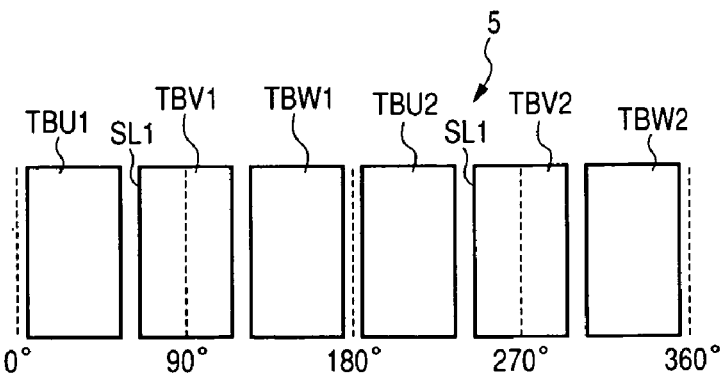
FIG. 2B is a development view of a stator of the electric motor shown in FIG. 1.
Figure 2C:
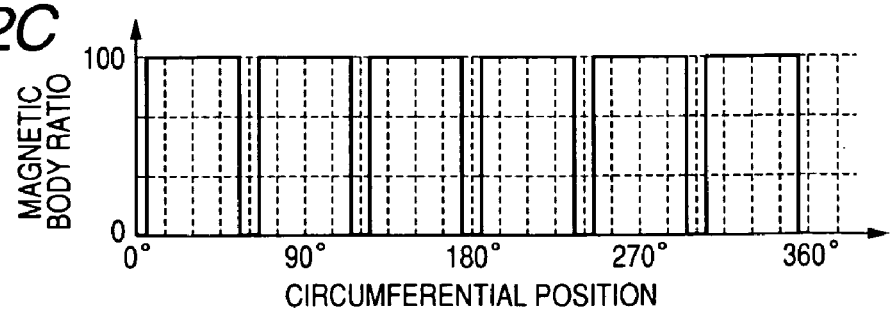
FIG. 2C is a view illustrating a magnetic body distribution ratio along a circumferential periphery of the stator with the vertical axis representing the magnetic body distribution ratio and the abscissa representing the circumferential periphery of the stator.

FIG. 1 is a transverse cross-sectional view showing a structure of an electric motor of a three-phase with four poles in a six-slot type to which the present invention is applied. Further, FIG. 2A is a development view showing a rotor of the electric motor shown in FIG. 1. FIG. 2B is a development view of a stator of the electric motor shown in FIG. 1. FIG. 2C is a view showing a magnetic body distribution ratio (%) along a circumferential periphery of the stator shown in FIG. 2B.

As shown in FIG. 1, the electric motor 1 is comprised of the rotor 2 and the stator 5 in which the rotor 2 is rotatably supported. The rotor 2 has an outer periphery carrying thereon N-pole permanent magnets 3 placed in first symmetric positions with respect to a center of the rotor 2 and S-pole permanent magnets 4 placed in second symmetric positions with respect to the center of the rotor 2, with the permanent magnets 3 and 4 being alternately located on the outer periphery of the rotor 2. Further, the stator 5 takes the form of a winding structure configured in a so-called concentrated winding and includes a plurality of stator poles carrying thereon concentrated windings in various phases. More particularly, the stator poles TBU1, TBU2 in a U-phase carry U-phase windings WBU1, WBU2, respectively. Likewise, the stator poles TBV1, TBV2 in a V-phase carry V-phase windings WBV1, WBV2, respectively. Also, the stator poles TBW1, TBW2 in a W-phase carry W-phase windings WBW1, WBW2, respectively. The stator poles have slots SL1, respectively.

Magnetic reluctance along the circumferential periphery of the stator 5 mainly depends on a ratio (of stator poles) of a magnetic material section with respect to an axial length of the stator and varies such that the higher the ratio, the lower will be the magnetic reluctance. Accordingly, with such a structure comprised of the rotor 2 and the stator 5 shown in FIGS. 2A and 2B, each stator salient pole (stator pole) has a magnetic body area with a ratio of 0% and cogging torque occurs for each cycle of a salient pole interval in synchronism with a difference in magnetic reluctance between 0% and 100% ratios of magnetic body areas. With the above principle in mind, cogging torque can be minimized by structuring a stator in a stator pole geometry with a minimized variation in a magnetic body area.

Also, although FIG. 1 and FIGS. 2A to 2C show an example of the electric motor 1 with the three-phase, four-pole and six-slot surface magnet type, a scheme of reducing cogging torque mentioned above is not limited to the electric motor exemplified above and may have applications to various types of electric motors with any of the number of phases, the number of poles, the number of slots and types of rotors. Moreover, while the electric motor 1 is shown in FIG. 1 with reference to the type having the rotor 2 on which the magnets 3, 4 are mounted, the present invention is not limited to such an electric motor and may have application to an electric motor having a stator on which magnets are carried. Next, description is made of schemes for minimizing cogging torque of the electric motor.

According to the present invention, the stator has a stator pole geometry having magnetic reluctance equalizing elements, such as non-magnetic body segments and magnetic body segments, which are incorporated into stator poles in a given distribution pattern along a circumferential periphery of the stator in a way to equalize a magnetic body area ratio to reduce a difference in magnetic reluctance. With such a stator pole geometry, cogging torque can be remarkably reduced. More particularly, the stator may preferably include a circumferential periphery on which the non-magnetic body segments and the magnetic body segments are additionally incorporated into the stator poles, respectively, in a stator pole geometry to have a substantially equalized magnetic body distribution ratio along the circumferential periphery of the stator.

Figure 3A:
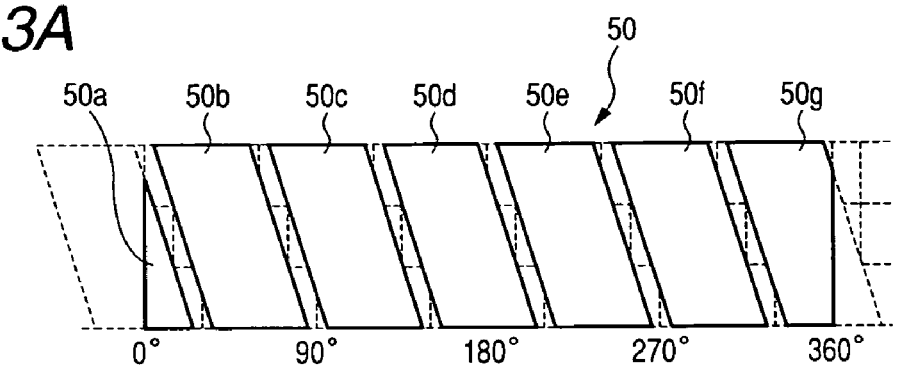
FIG. 3A is a development view of a stator including stator poles skewed at a given angle to which the present invention is applied.
Figure 3B:
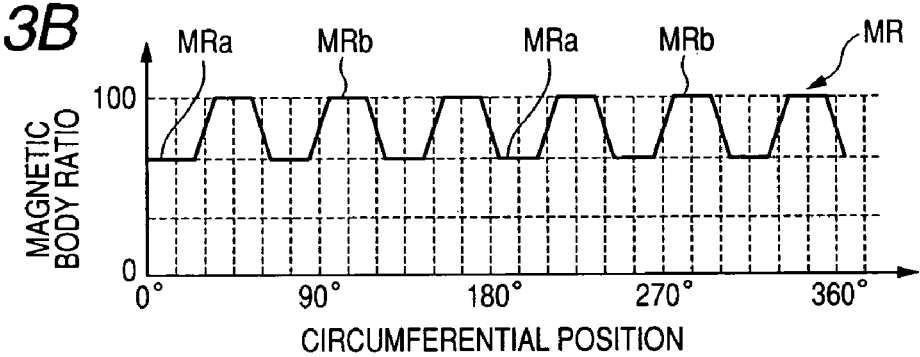
FIG. 3B is a view illustrating a magnetic body distribution ratio along a circumferential periphery of the stator shown in FIG. 3A with the vertical axis representing the magnetic body distribution ratio and the abscissa representing the circumferential periphery of the stator.

FIGS. 3A and 3B are views showing an electric motor to which the present invention is applied. The electric motor includes a rotor (not shown) and a stator 50 composed of skewed stator poles 50a to 50g separated by slots SL2, respectively. With such a structure, the stator poles 50a to 50g are skewed at a mechanical angle of 30 degrees and the stator 50 has a magnetic body distribution ratio that varies in a wide range as shown in FIG. 3B. That is, the magnetic body distribution ratio has low-ratio magnetic body distribution areas MRa and high-ratio magnetic body distribution areas MRb that are alternately disposed in a wide range along a circumferential periphery of the stator 50.

Figure 4A:
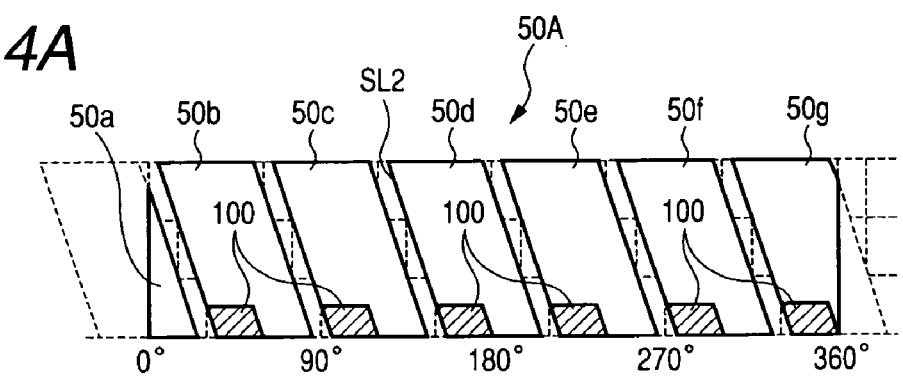
FIG. 4A is a development view of a stator of an electric motor of a first embodiment according to the present invention.
Figure 4B:
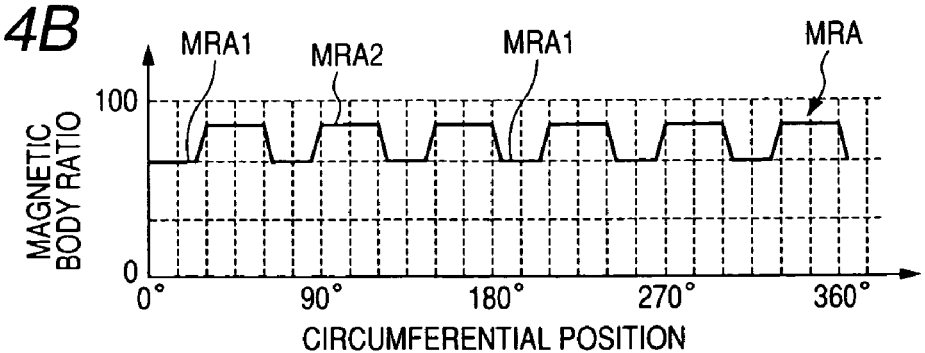
FIG. 4B is a view illustrating a magnetic body distribution ratio along a circumferential periphery of the stator shown in FIG. 4A with the vertical axis representing the magnetic body distribution ratio and the abscissa representing the circumferential periphery of the stator.

FIGS. 4A and 4B are views showing an electric motor of a first embodiment according to the present invention. With the electric motor of the present embodiment, a stator 50A fundamentally has the same structure as the stator 50 shown in FIG. 3A except for stator poles 50b to 50g having one axial ends provided with magnetic reluctance equalizing elements including non-magnetic body segments 100, respectively, in a high-ratio magnetic body distribution area. With the stator 50A having the high-ratio magnetic body distribution area additionally incorporating the non-magnetic body segments 100 as shown in FIG. 4A, the stator 50A has low-ratio magnetic body distribution areas MRA1 and high-ratio magnetic body distribution areas MRA2 that vary in a minimized range MRA along the circumferential periphery of the stator 50A. Since the low-ratio magnetic body distribution areas MRA1 and the high-ratio magnetic body distribution areas MRA2 have less variation in the magnetic body distribution ratio, the stator 50A has a roughly equalized magnetic reluctance over the circumferential periphery of the stator. This results in reduction in cogging torque of the electric motor.

Figure 5A:
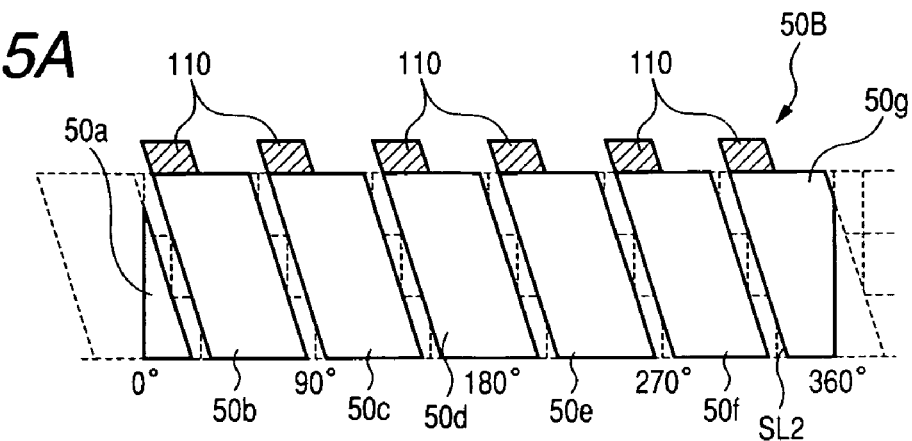
FIG. 5A is a development view of a stator of an electric motor of a second embodiment according to the present invention.
Figure 5B:
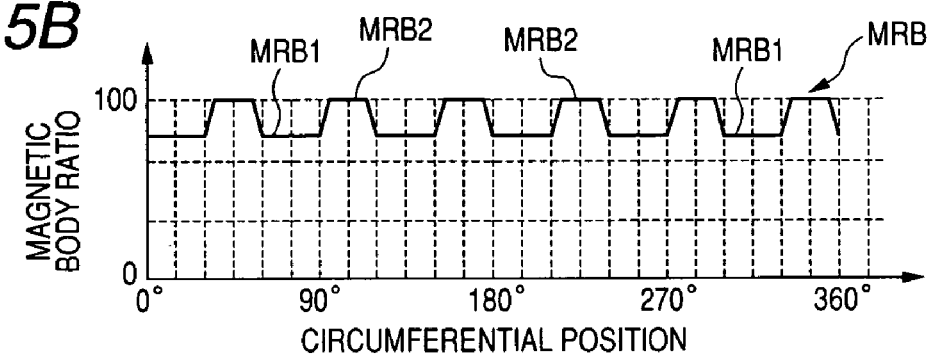
FIG. 5B is a view illustrating a magnetic body distribution ratio along a circumferential periphery of the stator shown in FIG. 5A with the vertical axis representing the magnetic body distribution ratio and the abscissa representing the circumferential periphery of the stator.

FIGS. 5A and 5B are views showing an electric motor of a second embodiment according to the present invention. With the electric motor of the present embodiment, a stator 50B fundamentally has the same structure as the stator 50 shown in FIG. 3A except for stator poles 50b to 50g having one axial ends provided with magnetic reluctance equalizing elements including magnetic body segments 110, respectively, in an area laying at a low-ratio magnetic body distribution area. With the stator 50B having the low-ratio magnetic body distribution area additionally incorporating the magnetic body segments 110 as the magnetic reluctance equalizing elements as shown in FIG. 5A, the stator 50B has low-ratio magnetic body distribution areas MRB1 and high-ratio magnetic body distribution areas MRB2 that vary in a minimized range along the circumferential periphery of the stator 50B. Since the low-ratio magnetic body distribution areas MRB1 and the high-ratio magnetic body distribution areas MRB2 have less variation in magnetic body distribution ratio, the stator 50B has a roughly equalized magnetic reluctance area MRB as shown in FIG. 5B.

While the first and second embodiments have been described with reference to the structures additionally incorporating only one of the non-magnetic body segments 100, shown in FIG. 4A, and the magnetic body segments 110, shown in FIG. 5A, it will be appreciated that the electric motor can be modified so as to include both of these non-magnetic body segments 100 and the magnetic body segments 110 as the magnetic reluctance equalizing elements in similar advantageous effects. Moreover, the present invention has no intention to be limited to shapes and the number of the magnetic reluctance equalizing elements such as non-magnetic body segments 100 and the magnetic body segments 110 to be incorporated in the stator of the electric motor.

Figure 6A:
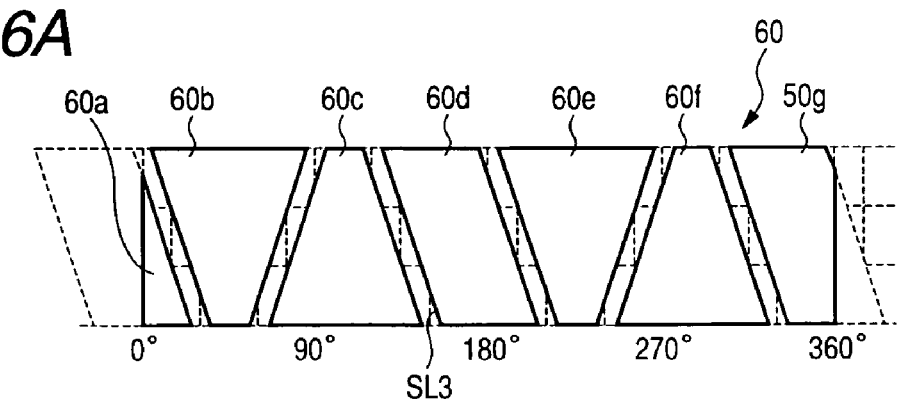
FIG. 6A is a development view of a stator of an electric motor of another type to which the present invention is applied.
Figure 6B:
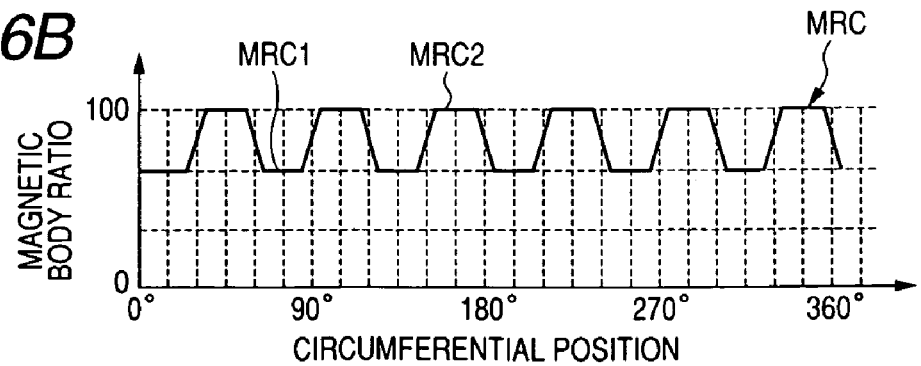
FIG. 6B is a view illustrating a magnetic body distribution ratio along a circumferential periphery of the stator shown in FIG. 6A with the vertical axis representing the magnetic body distribution ratio and the abscissa representing the circumferential periphery of the stator.

FIGS. 6A and 6B are views showing another example of an electric motor to which the present invention is applied. With the structure shown in FIGS. 6A and 6B, the electric motor includes a stator 60 composed of nonidentical salient stator poles 60a to 60g separated by slots SL3, respectively. More particularly, the stator 60 is comprised of parallelogram-shaped stator magnet poles 60a, 60d, 60g, trapezoid-shaped stator magnet poles 60b, 60c placed in an upside down configuration between the stator poles 60a, 60d, and trapezoid-shaped stator magnet poles 60b, 60c, placed in an upside down configuration between the stator poles 60d, 60g. With such a structure, the stator 60 has a magnetic body distribution area MRC that varies in a wide range as shown in FIG. 6B. That is, the magnetic body distribution area includes low-ratio magnetic body distribution areas MRC1 and high-ratio magnetic body distribution areas MRC2 that are alternately distributed along a circumferential periphery of the stator 60.

Figure 7A:
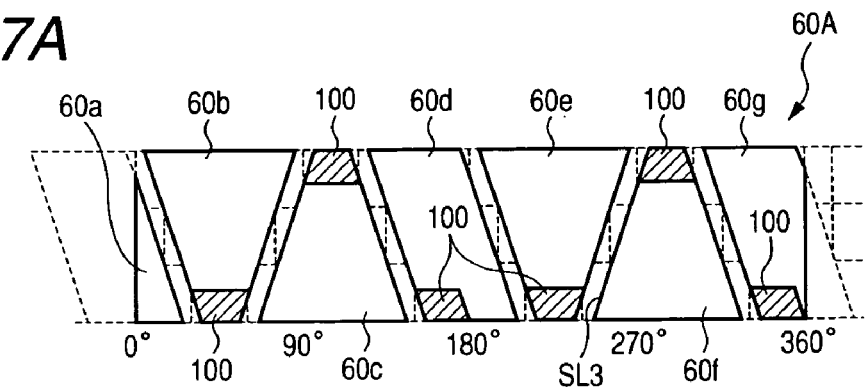
FIG. 7A is a development view of a stator of an electric motor of a third embodiment according to the present invention.
Figure 7B:
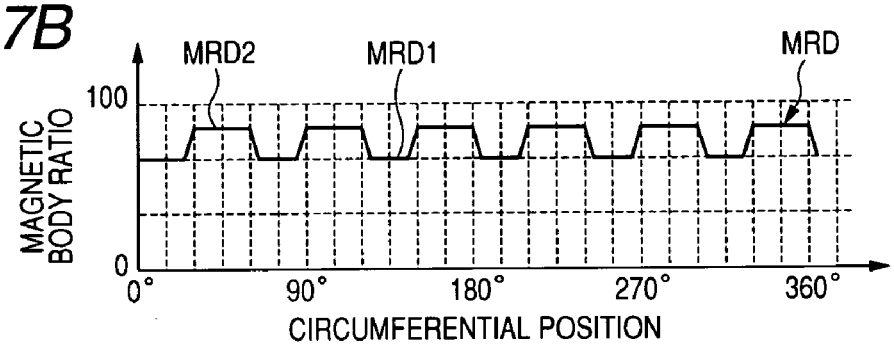
FIG. 7B is a view illustrating a magnetic body distribution ratio along a circumferential periphery of the stator shown in FIG. 7A with the vertical axis representing the magnetic body distribution ratio and the abscissa representing the circumferential periphery of the stator.

FIGS. 7A and 7B are views showing an electric motor of a third embodiment according to the present invention. With the electric motor of the present embodiment, a stator 60A fundamentally has the same structure as the stator 60 shown in FIG. 6A except for stator poles 60b to 60g having axial ends provided with magnetic reluctance equalizing elements including non-magnetic body segments 100, respectively, that are alternately disposed in opposing axial ends of the stator poles 60b to 60g in a high-ratio magnetic body distribution area. In particular, with the structure shown in FIG. 7A, the trapezoid-shaped stator magnet poles 60b, 60c, 60e, 60f have narrow ends incorporating the non-magnetic body segments 100, respectively. The stator poles 60d, 60g also incorporate the non-magnetic body segments 100, respectively. With such a stator 60A having the high-ratio magnetic body distribution areas additionally incorporating the non-magnetic body segments 100 as shown in FIG. 7A, the stator 60A has low-ratio magnetic body distribution areas MRD1 and high-ratio magnetic body distribution areas MRD2 that vary in a minimized range along the circumferential periphery of the stator 60A. Since the low-ratio magnetic body distribution areas MRD1 and the high-ratio magnetic body distribution areas MRD2 have less variation in magnetic body distribution ratio, the stator 60A has a roughly equalized magnetic reluctance area MRD.

Figure 8A:
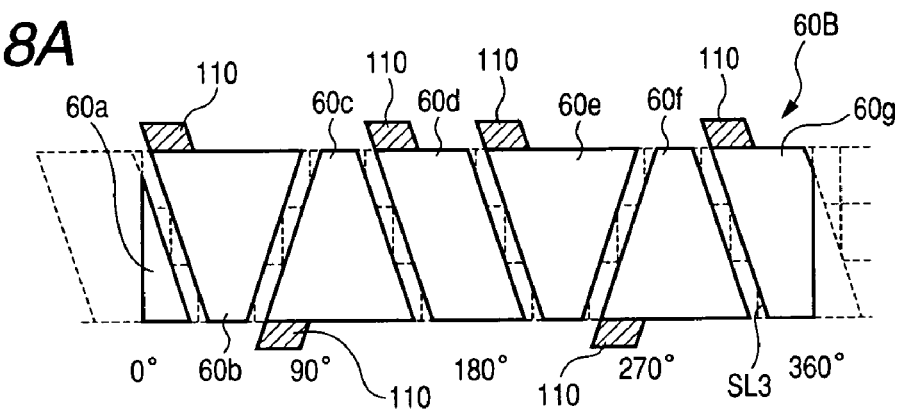
FIG. 8A is a development view of a stator of an electric motor of a fourth embodiment according to the present invention.
Figure 8B:
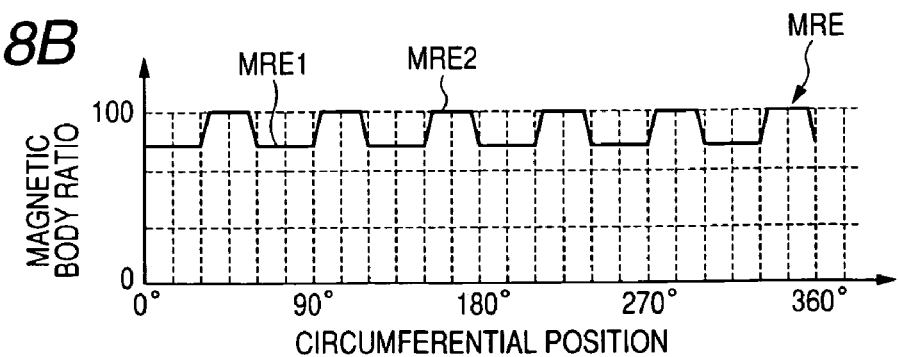
FIG. 8B is a view illustrating a magnetic body distribution ratio along a circumferential periphery of the stator shown in FIG. 8A with the vertical axis representing the magnetic body distribution ratio and the abscissa representing the circumferential periphery of the stator.

FIGS. 8A and 8B are views showing an electric motor of a fourth embodiment according to the present invention. With the electric motor of the present embodiment, a stator 60B fundamentally has the same structure as the stator 60 shown in FIG. 6A except for stator poles 60b to 60g having one axial ends provided with magnetic reluctance equalizing elements including magnetic body segments 110, respectively, that are alternately disposed in areas adjacent to the axial wide ends of the stator poles 60b to 60g in low-ratio magnetic body distribution areas at axial ends of the stator poles 60b to 60g. In particular, with the structure shown in FIG. 8A, the trapezoid-shaped stator magnet poles 60b, 60c, 60e, 60f have wide ends to which the magnetic body segments 110 are attached, respectively, in the low-ratio magnetic body distribution areas. Also, the stator poles 60d, 60g also incorporate the magnetic body segments 110, respectively. With the stator 60B having the low-ratio magnetic body distribution areas additionally incorporating the magnetic body segments 110 as shown in FIG. 8A, the stator 60B has low-ratio magnetic body distribution areas MRE1 and high-ratio magnetic body distribution areas MRE2 that vary in a minimized range along the circumferential periphery of the stator 60B. Since the low-ratio magnetic body distribution areas MRE1 and the high-ratio magnetic body distribution areas MRE2 have less variation in magnetic body distribution ratio, the stator 60B has a roughly equalized magnetic reluctance area MRE.

Figure 9A:
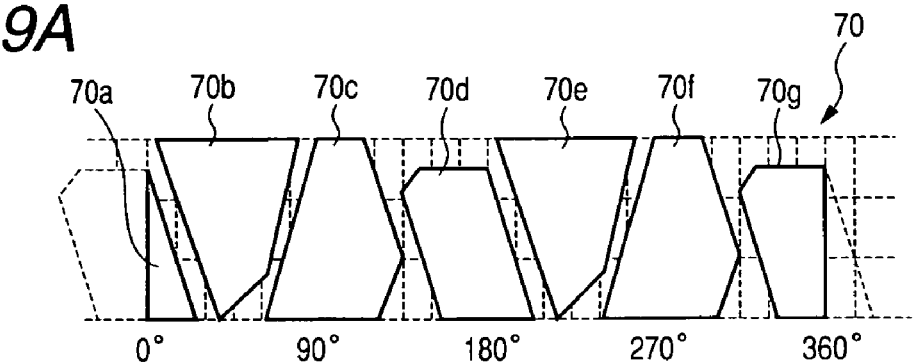
FIG. 9A is a development view of a stator of an electric motor of still another type to which the present invention is applied.
Figure 9B:
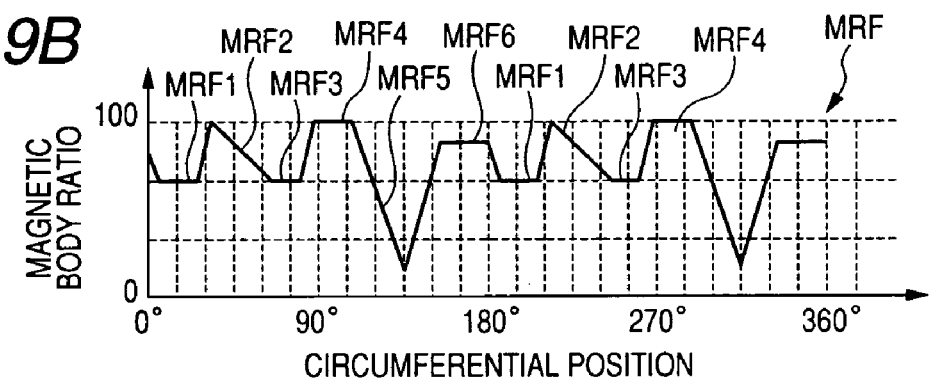
FIG. 9B is a view illustrating a magnetic body distribution ratio along a circumferential periphery of the stator shown in FIG. 9A with the vertical axis representing the magnetic body distribution ratio and the abscissa representing the circumferential periphery of the stator.

FIGS. 9A and 9B are views showing an electric motor of another type to which the present invention is applied. With the structure of the electric motor shown in FIG. 9A, a stator 70 includes stator magnet poles 70a to 70g that are formed in arbitrarily nonidentical shapes arranged in a circumferential periphery of the stator 70. With such a structure, the stator 70 has a magnetic body distribution ratio MRF, composed of MRF1 to MRF5, which varies in a wide range along the circumferential periphery of the stator. The stator 70, having the stator poles configured in such shapes mentioned above, may preferably include magnetic reluctance equalizing elements in a manner as will be described below.

Figure 10A:
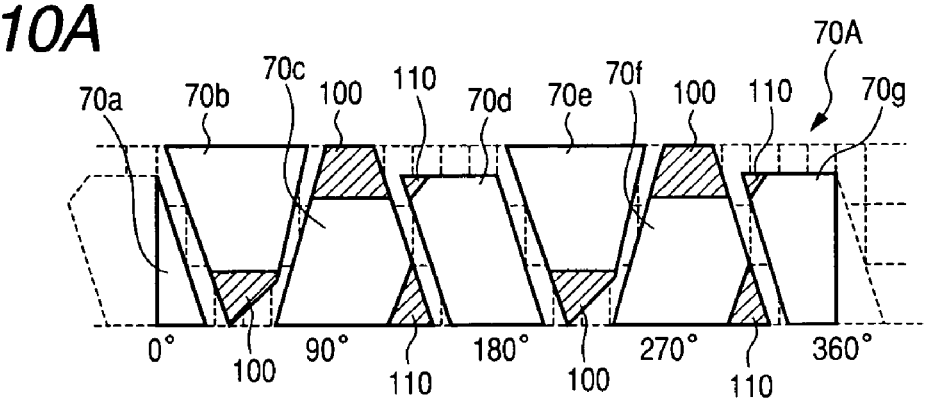
FIG. 10A is a development view of a stator of an electric motor of a fifth embodiment according to the present invention.
Figure 10B:
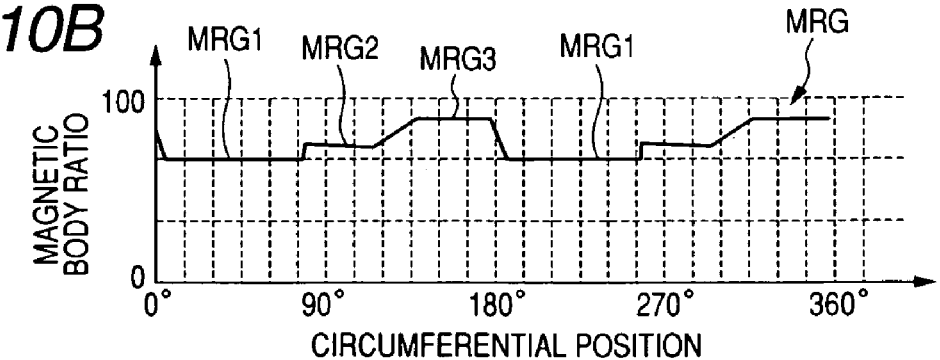
FIG. 10B is a view illustrating a magnetic body distribution ratio along a circumferential periphery of the stator shown in FIG. 10A with the vertical axis representing the magnetic body distribution ratio and the abscissa representing the circumferential periphery of the stator.

FIGS. 10A and 10B are views showing an electric motor of a fifth embodiment according to the present invention. With the electric motor of the present embodiment, a stator 70A fundamentally has the same structure as the stator 70 shown in FIG. 9A except for stator poles 70b to 70g having axial ends provided with magnetic reluctance equalizing elements including non-magnetic body segments 100 disposed in high-ratio magnetic body distribution areas and magnetic body segments 110 that are disposed in low-ratio magnetic body distribution areas. In particular, with the structure shown in FIG. 10A, the stator magnet poles 70b, 70c, 70f, 70g have the non-magnetic body segments 100, respectively. The stator magnet poles 70c, 70f have wide ends having one corners provided with magnetic body segments 110 in the low-ratio magnetic body distribution area. Moreover, the stator poles 70d, 70g have respective upper corners incorporating magnetic body segments 110, respectively. With such a stator 70A additionally incorporating the non-magnetic body segments 100 and the magnetic body segments 110 as shown in FIG. 10A, the stator 70A has first-ratio magnetic body distribution areas MRG1, second-ratio magnetic body distribution areas MRG2 and third-ratio magnetic body distribution areas MRG3 that vary in a minimized range along the circumferential periphery of the stator 70A. Since the magnetic body distribution areas MRG1 to MRG3 have less variation in magnetic body distribution ratio, the stator 70A has a roughly equalized magnetic reluctance area MRG.

Figure 11A:
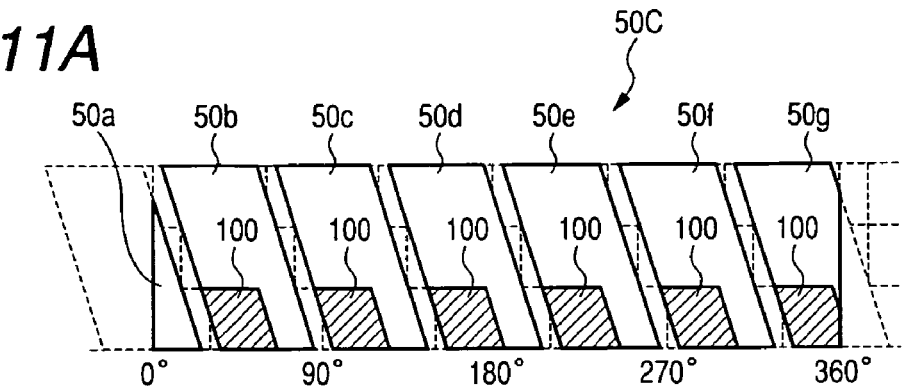
FIG. 11A is a development view of a stator of an electric motor of a sixth embodiment according to the present invention.
Figure 11B:
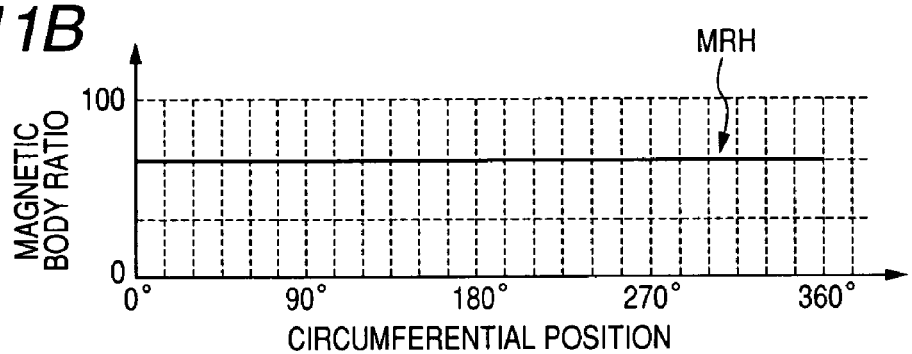
FIG. 11B is a view illustrating a magnetic body distribution ratio along a circumferential periphery of the stator shown in FIG. 11A with the vertical axis representing the magnetic body distribution ratio and the abscissa representing the circumferential periphery of the stator.

FIGS. 11A and 11B are views showing an electric motor of a sixth embodiment according to the present invention. With the electric motor of the present embodiment, a stator 50C fundamentally has the same structure as the stator 50 shown in FIG. 3A except for stator poles 50b to 50g having one axial ends provided with magnetic reluctance equalizing elements including non-magnetic body segments 100, respectively, in a high-ratio magnetic body distribution area. More particularly, the stator pole piece 50b to 50g have one axial ends having corner areas formed with the non-magnetic body segments 100, respectively. With the stator 50C having the high-ratio magnetic body distribution areas additionally incorporating the non-magnetic body segments 100 as shown in FIG. 11A, the stator 50C has a fully equalized magnetic reluctance area MRH along the circumferential periphery of the stator 50C.

Figure 11C:
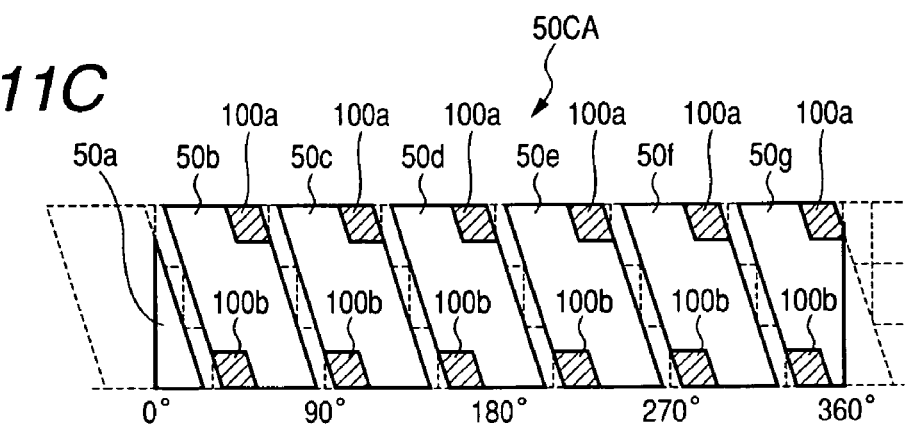
FIG. 11C is a development view of a stator of an electric motor of a modified form of the electric motor shown in FIG. 11A.
Figure 11D:
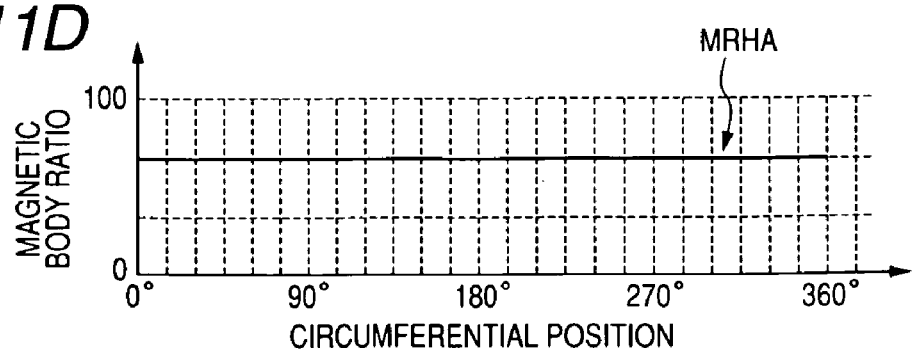
FIG. 11D is a view illustrating a magnetic body distribution ratio along a circumferential periphery of the stator shown in FIG. 11C with the vertical axis representing the magnetic body distribution ratio and the abscissa representing the circumferential periphery of the stator.

FIGS. 11C and 11D are views showing an electric motor of a modified form of the sixth embodiment shown in FIGS. 11A and 11B. In this modified form, a stator 50CA comprises the magnetic reluctance equalizing means including a first group of non-magnetic segments 100a and a second group of non-magnetic segments 100b associated with the stator poles, respectively, at symmetric positions with respect to a center point of the stator. In particular, the first group of non-magnetic segments 100a is disposed at right corners of the stator poles 50b to 50g of the stator at one end thereof, respectively, and the second group of non-magnetic segments 100b is disposed at left corners of the stator poles 50b to 50g of the stator at the other end thereof, respectively. The structure of the stator mentioned above has a magnetic body distribution area MRHA with a uniform magnetic body distribution ratio, achieving remarkable reduction on cogging torque.

Figure 11E:
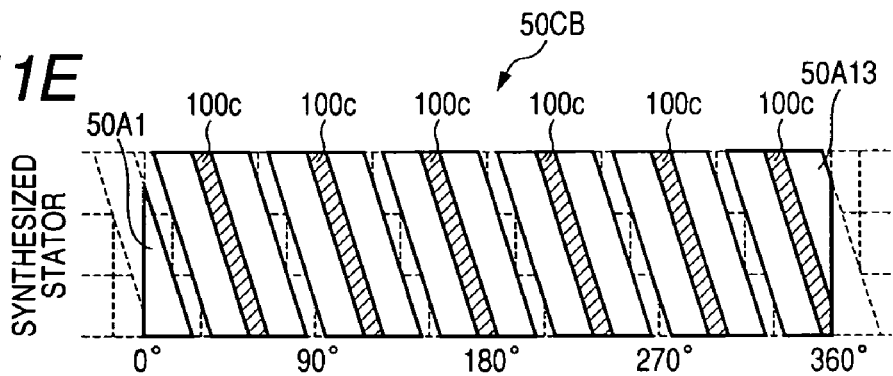
FIG. 11E is a development view of a stator of an electric motor of a further modified form of the electric motor shown in FIG. 11A.
Figure 11F:
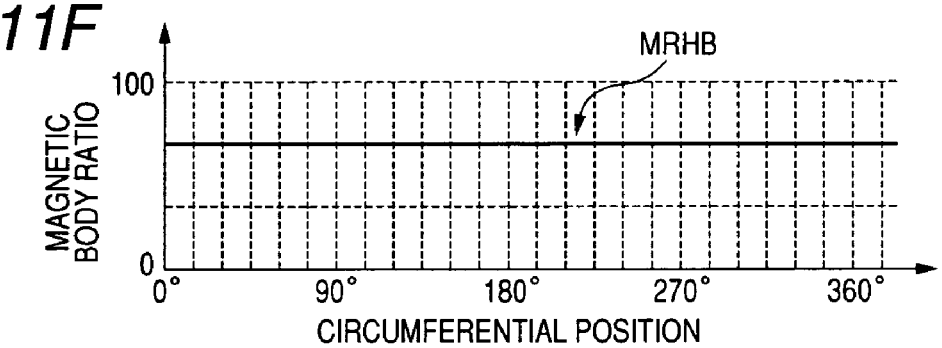
FIG. 11F is a view illustrating a magnetic body distribution ratio along a circumferential periphery of the stator shown in FIG. 11E with the vertical axis representing the magnetic body distribution ratio and the abscissa representing the circumferential periphery of the stator.

FIGS. 11E and 11F are views showing an electric motor of a further modified form of the sixth embodiment shown in FIGS. 11A and 11B. In this modified form, a stator 50CB comprises the magnetic reluctance equalizing means including non-magnetic segments 100c disposed in pole-to-pole air gaps in a way to axially extend from one ends of stator poles 50A1 to 50A13 to the other ends thereof, respectively. The structure of the stator mentioned above has a magnetic body distribution area MRHB with a uniform magnetic body distribution ratio, achieving remarkable reduction on cogging torque.

Figure 12A:
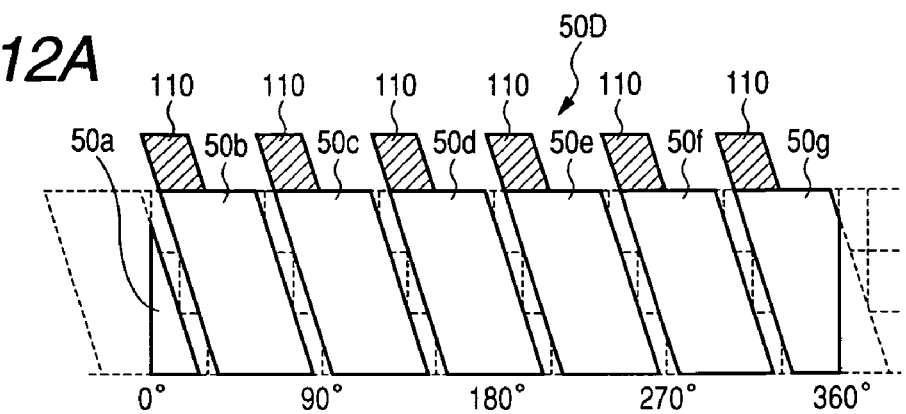
FIG. 12A is a development view of a stator of an electric motor of a seventh embodiment according to the present invention.
Figure 12B:
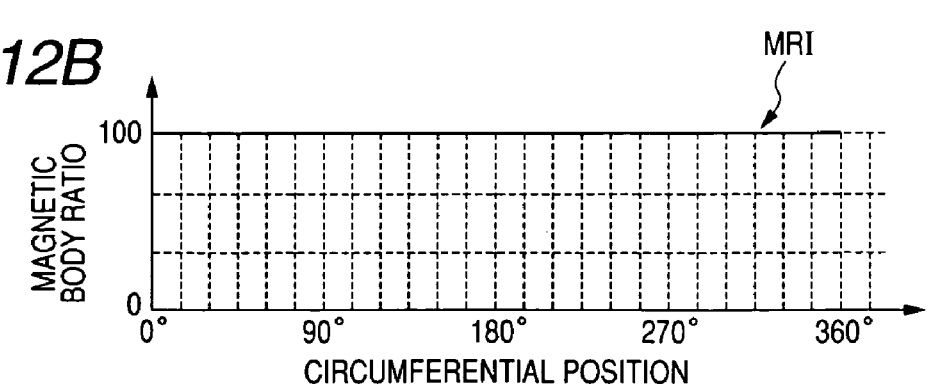
FIG. 12B is a view illustrating a magnetic body distribution ratio along a circumferential periphery of the stator shown in FIG. 12A with the vertical axis representing the magnetic body distribution ratio and the abscissa representing the circumferential periphery of the stator.

FIGS. 12A and 12B are views showing an electric motor of a seventh embodiment according to the present invention. With the electric motor of the present embodiment, a stator 50D fundamentally has the same structure as the stator 50 shown in FIG. 3A except for stator poles 50b to 50g having one axial ends to which magnetic reluctance equalizing elements including magnetic body segments 110 are attached, respectively, in a low-ratio magnetic body distribution area. More particularly, the stator 50D has the low-ratio magnetic body distribution areas adjacent to the one axial ends of the stator pole piece 50b to 50g, respectively, in which the non-magnetic body segments 110 are disposed in association with the stator poles 50b to 50g, respectively. With the stator 50D having the low-ratio magnetic body distribution areas additionally incorporating the magnetic body segments 110 as the magnetic reluctance equalizing elements as shown in FIG. 12A, the stator 50D has a fully equalized magnetic reluctance area MRI with remarkable suppression of cogging torque in the electric motor.

Figure 13A:
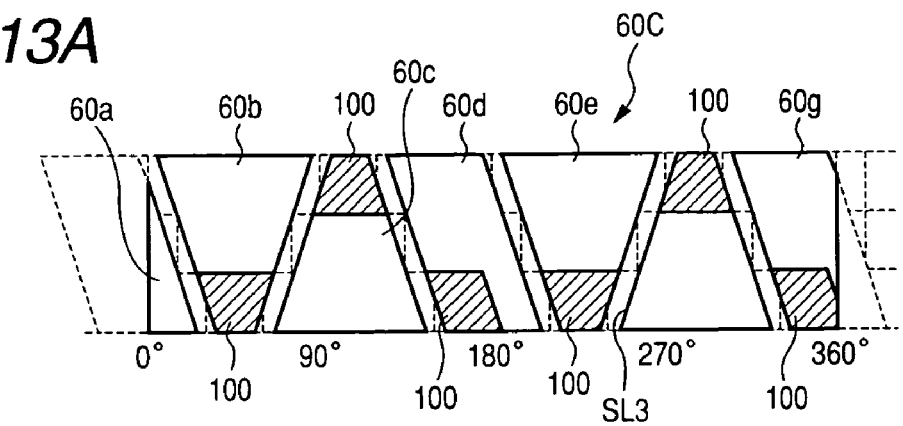
FIG. 13A is a development view of a stator of an electric motor of an eighth embodiment according to the present invention.
Figure 13B:
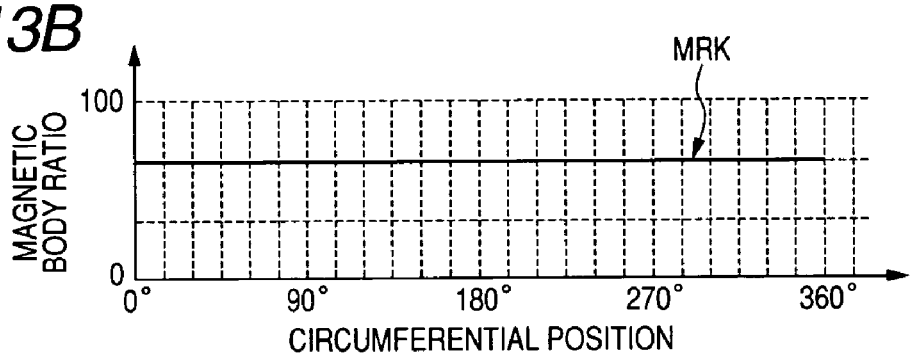
FIG. 13B is a view illustrating a magnetic body distribution ratio along a circumferential periphery of the stator shown in FIG. 13A with the vertical axis representing the magnetic body distribution ratio and the abscissa representing the circumferential periphery of the stator.

FIGS. 13A and 13B are views showing an electric motor of an eighth embodiment according to the present invention. With the electric motor of the present embodiment, a stator 60C fundamentally has the same structure as the stator 60 shown in FIG. 6A except for stator poles 60b to 60g having axial ends provided with magnetic reluctance equalizing elements including non-magnetic body segments 100, respectively, that are alternately disposed in opposing axial ends of the stator poles 60b to 60g in high-ratio magnetic body distribution areas. In particular, with the structure shown in FIG. 13A, the trapezoid-shaped stator magnet poles 60b, 60c, 60e, 60f have narrow ends on which the non-magnetic body segments 100 are located, respectively. With the stator 60C having the high-ratio magnetic body distribution areas additionally incorporating the non-magnetic body segments 100 as shown in FIG. 13A, the stator 60C has a fully equalized magnetic reluctance area MRK.

Figure 14A:
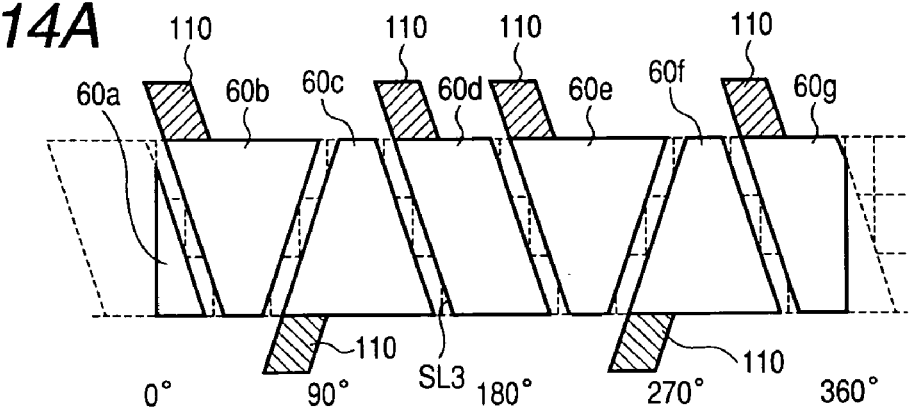
FIG. 14A is a development view of a stator of an electric motor of a ninth embodiment according to the present invention.
Figure 14B:
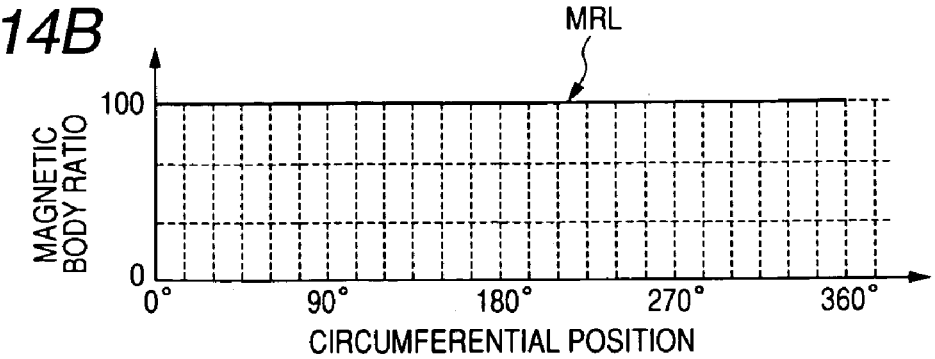
FIG. 14B is a view illustrating a magnetic body distribution ratio along a circumferential periphery of the stator shown in FIG. 14A with the vertical axis representing the magnetic body distribution ratio and the abscissa representing the circumferential periphery of the stator.

FIGS. 14A and 14B are views showing an electric motor of a ninth embodiment according to the present invention. With the electric motor of the present embodiment, a stator 60D fundamentally has the same structure as the stator 60 shown in FIG. 6A except for stator poles 60b to 60g having magnetic reluctance equalizing elements including magnetic body segments 110, respectively, that are alternately disposed in areas adjacent to the axial wide ends of the stator poles 60b to 60g in low-ratio magnetic body distribution areas. In particular, with the structure shown in FIG. 14A, the trapezoid-shaped stator magnet poles 60b, 60c, 60e, 60f have wide ends to which the magnetic body segments 110 are attached, respectively. With the stator 60D having the low-ratio magnetic body distribution areas additionally incorporating the magnetic body segments 110 as shown in FIG. 14A, the stator 60D has a fully equalized magnetic reluctance area MRL.

Figure 15A:
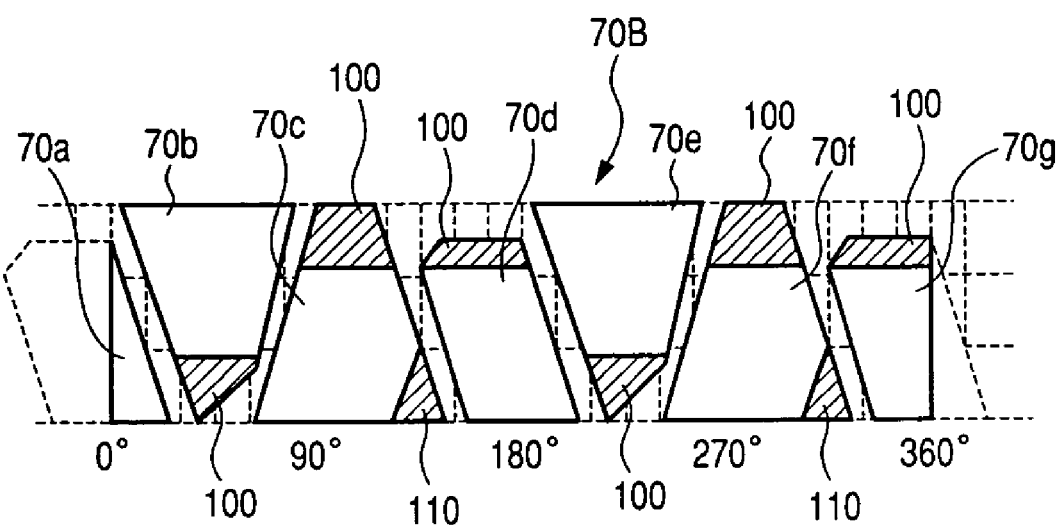
FIG. 15A is a development view of a stator of an electric motor of a tenth embodiment according to the present invention.
Figure 15B:
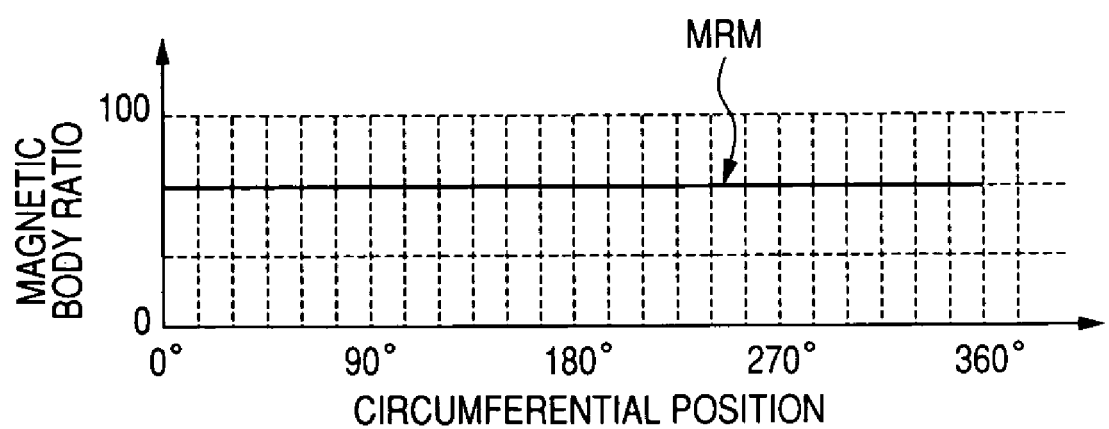
FIG. 15B is a view illustrating a magnetic body distribution ratio along a circumferential periphery of the stator shown in FIG. 15A with the vertical axis representing the magnetic body distribution ratio and the abscissa representing the circumferential periphery of the stator.

FIGS. 15A and 15B are views showing an electric motor of a tenth embodiment according to the present invention. With the electric motor of the present embodiment, a stator 70B fundamentally has the same structure as the stator 70 shown in FIG. 9A except for stator poles 70b to 70g having axial ends provided with magnetic reluctance equalizing elements including non-magnetic body segments 100 disposed in high-ratio magnetic body distribution areas and magnetic body segments 110 that are disposed in low-ratio magnetic body distribution areas. In particular, with the structure shown in FIG. 15A, the stator magnet poles 70b, 70c, 70f, 70g have the non-magnetic body segments 100, respectively. The stator magnet poles 70c, 70f have wide ends having one corners provided with magnetic body segments 110 in the low-ratio magnetic body distribution areas. With the stator 70B of such a structure additionally incorporating the non-magnetic body segments 100 and the magnetic body segments 110 as shown in FIG. 15A, the stator 70D has a fully equalized magnetic reluctance area MRM.

While the first to tenth embodiments have been described above with a focus only on the magnetic body distribution ratio of the stator, a three-dimensional flow of magnetic flux cannot be ignored when manufacturing an electric motor in actual practice. Especially, not only magnetic fluxes flow into upper and lower end portions (both ends in an axial direction) of each salient pole but also magnetic fluxes flow from air gap portions adjacent the upper and lower end portions of each salient pole. Accordingly, an adverse affect arising from such flowing-around magnetic fluxes cannot be ignored particularly for an electric motor of a flat shape, that is, an electric motor with a small ratio of a shaft length to a diameter of the electric motor, in which such an adverse affect is especially-pronounced on the both ends of the stator pole in the axial direction. Moreover, similar flowing-around magnetic fluxes are present in a rotational direction of the rotor and, so, an adverse affect arising from such magnetic fluxes cannot be disregarded.

Therefore, a stator is configured to have magnetic material portions disposed in a point symmetry with respect to a center of stator magnetic poles to cause adverse affects arising from flowing-around magnetic fluxes to be symmetrized on upper and lower areas of each stator pole, providing capability of minimizing such adverse affects. Alternatively, in case of an electric motor with the S-number of phases with a total skew angle of a stator and a rotor substantially falling in a value of 360/(2S) by an electric angle, the magnetic pole may have a substantially center area through which a non-magnetic member with the same width and the same angle as that of a non-magnetic member appearing between adjacent stator poles extends in an axial direction. With such a configuration, the electric motor may be sufficed to have the non-magnetic member formed in the substantially same shape as that of an air gap portion between the adjacent salient poles and three-dimensional flow of magnetic fluxes can be substantially equalized, enabling further reduction in the adverse affects.

Further, in a case where the various non-magnetic body segments 100 mentioned above may be preferably formed of air gaps, respectively. This results in a reduction in labor hours needed to fill the non-magnetic material to the non-magnetic body segments 100 and material to be filled as the non-magnetic body segments 100 can be omitted, obtaining an advantageous effect of minimizing cogging torque at reduced costs.

Figure 16A:
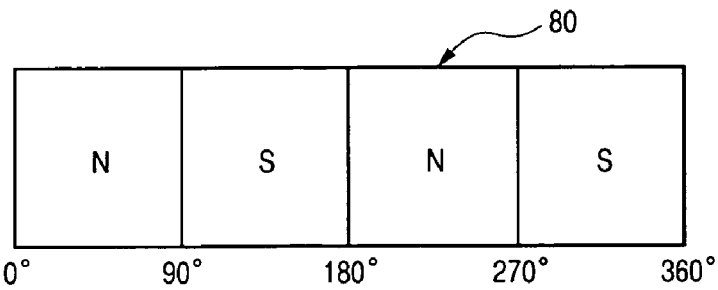
FIG. 16A is a development view of a rotor of an electric motor of an eleventh embodiment according to the present invention.
Figure 16B:
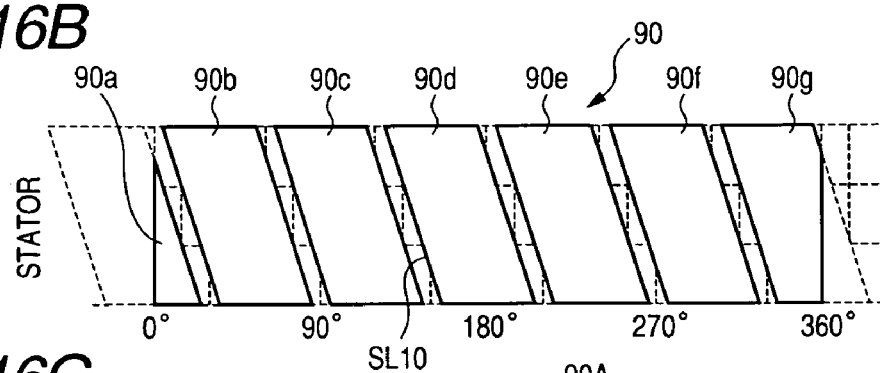
FIG. 16B is a development view of a stator comprised of a first group of stator poles for use in a method of determining a stator pole geometry according to the present invention.
Figure 16C:
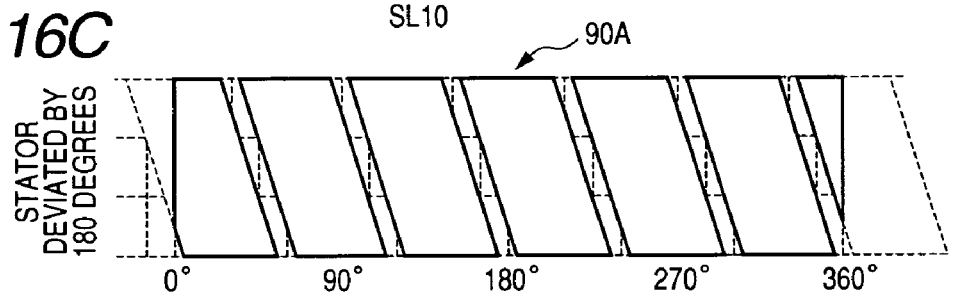
FIG. 16C is a development view of a second group of stator poles, deviated from the first group of stator poles by an electric angle of 180 degrees, for use in the method of determining a stator pole geometry according to the present invention.
Figure 16D:
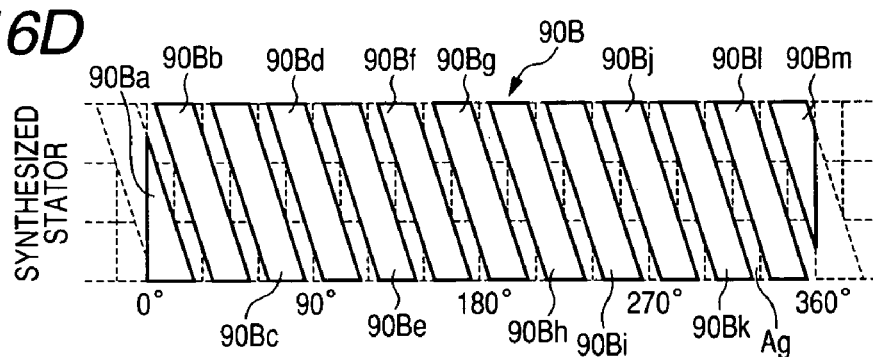
FIG. 16D is a development view of a stator resulting from synthesizing the first and second groups of stator poles shown in FIGS. 16B and 16C by carrying out the method of determining a stator pole geometry according to the present invention.
Figure 16E:
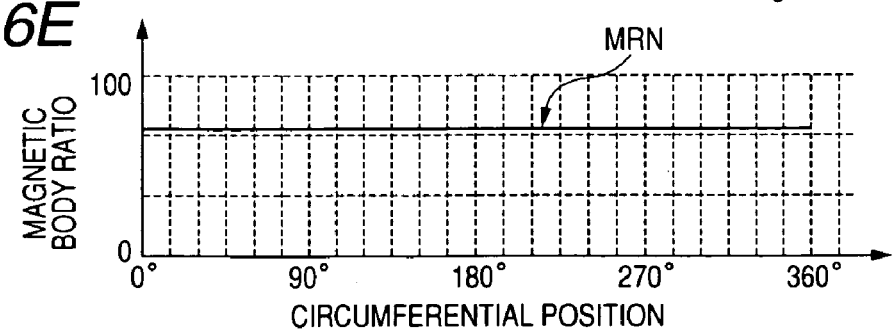
FIG. 16E is a view illustrating a magnetic body distribution ratio along a circumferential periphery of the stator shown in FIG. 16D with the vertical axis representing the magnetic body distribution ratio and the abscissa representing the circumferential periphery of the stator.

Next, reference is made to FIGS. 16A to 16E for explaining a method of determining a stator pole geometry for minimizing cogging torque in an electric motor according to the present invention. As set forth above, cogging torque occurs due to the presence of magnetic reluctance fluctuating in a rotational position of a rotor. When this takes place, cogging torque does not depend on polarities of magnets forming the rotor. Therefore, when taking only cogging torque into consideration, it can be said that a stator assuming a given position is equivalent to the stator, deviated from the given position to another position by an electric angle of 180 degrees, and no issue arises in taking cogging torque into consideration in terms of a stator pole geometry by synthesizing these stators in a manner as shown in FIGS. 16B to 16C. However, such attempt provides convenient representation when taking the stator pole geometry into consideration for reducing cogging torque and no intention is made to structure an electric motor with such an actually synthesized stator pole geometry.

Suppose the number S of phases is an odd number and a skew angle takes a value of 360/(2S) by an electric angle, synthesizing a certain stator and a stator, deviated from the certain stator by an electric angle of 180 degrees provides a stator pole geometry that has air gaps, each between adjacent stator poles, equally spaced from each other and an equalized magnetic body distribution ratio along a circumferential periphery of the stator.

FIGS. 16A to 16E show an example of an electric motor with a three-phase and four-poles in six slots. With such an exemplary structure, the electric motor includes a rotor 80, having an outer periphery carrying thereon alternately disposed N-poles and S-poles, and a stator 90 including stator poles 90a to 90g, equidistantly spaced apart in a circumferential direction of the stator 90 each by a slot SL10. The stator poles 90a to 90g are skewed at an electric angle of 60 degrees, that is, at a mechanical angle of 30 degrees. With such a structure, synthesizing the stator 90 and another stator 90A, deviated from the stator 90 by the electric angle of 180 degrees, allows a synthesized stator 90B to be formed. With such a stator pole geometry, the synthesized stator 90B is comprised of stator poles 90Ba to 90Bm that have pole-to-pole air gaps Ag (iron-to-iron air gaps in the case of a structure wherein only a stator is skewed) juxtaposed at a mechanical angle of 30 degrees and skewed at an electric angle of 30 degrees. Thus, the stator 90B has a magnetic body distribution ratio MRN equalized in a circumferential periphery of the stator 90B.

Figure 17A:
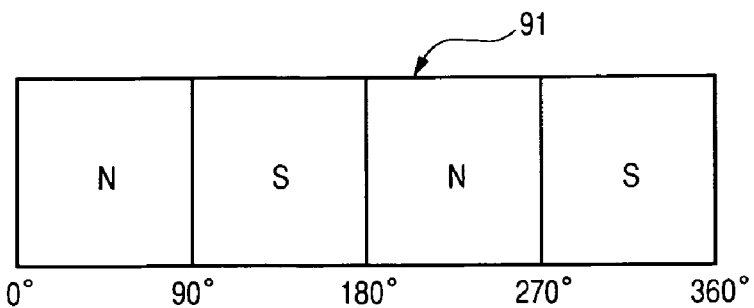
FIG. 17A is a development view of a rotor of an electric motor of a twelfth embodiment according to the present invention.
Figure 17B:
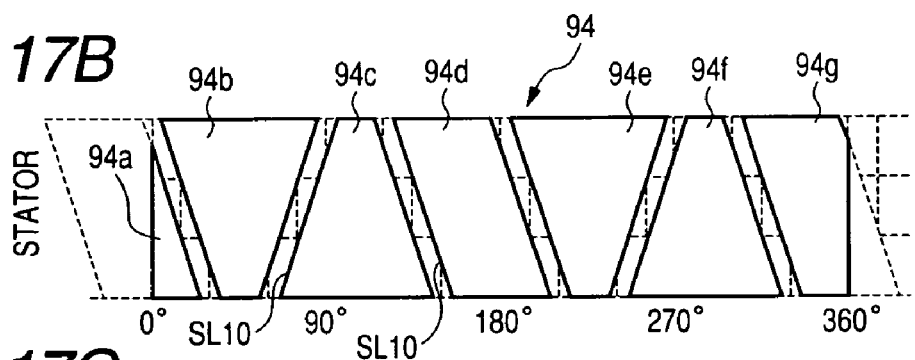
FIG. 17B is a development view of another type of a stator comprised of a first group of stator poles for use in another method of determining a stator pole geometry according to the present invention.
Figure 17C:
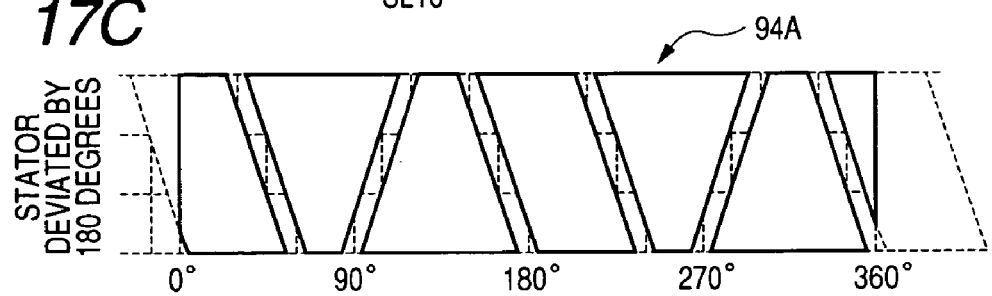
FIG. 17C is a development view of a second group of stator poles, deviated from the first group of stator poles by an electric angle of 180 degrees, for use in another method of determining a stator pole geometry according to the present invention.
Figure 17D:
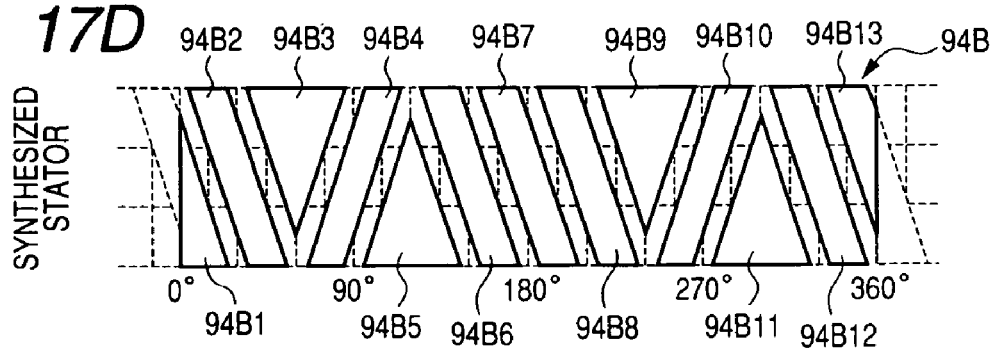
FIG. 17D is a development view of a stator resulting from synthesizing the first and second groups of stator poles shown in FIGS. 17B and 17C by carrying out another method of determining a stator pole geometry according to the present invention.
Figure 17E:
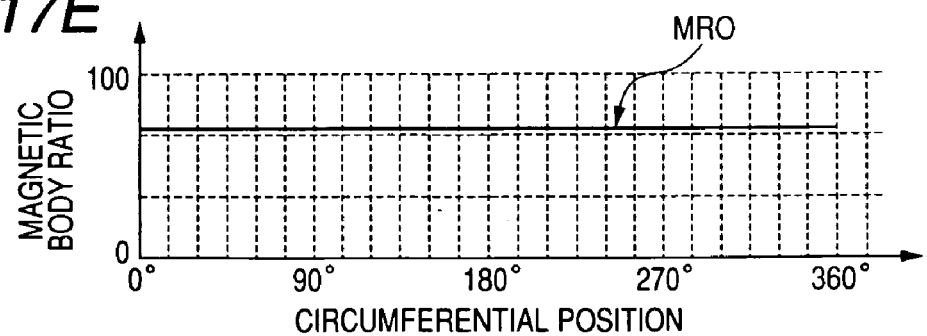
FIG. 17E is a view illustrating a magnetic body distribution ratio along a circumferential periphery of the stator shown in FIG. 17D with the vertical axis representing the magnetic body distribution ratio and the abscissa representing the circumferential periphery of the stator.

Also, as shown in FIGS. 17A to 17E, a modified form of the electric motor may preferably include a rotor 91, having an outer periphery carrying thereon alternately disposed N-poles and S-poles, and a stator 92 comprised of stator poles 94a to 94g, formed in the same nonidentical salient pole configurations as those of the stator shown in FIG. 14A, which are spaced apart in a circumferential direction of the stator 94. With such a structure, synthesizing the stator 94, and another stator 94A, deviated from the stator 94 by an electric angle of 180 degrees, allows a stator 94B to be formed in a synthesized stator pole geometry as shown in FIG. 17D. With such a structure, the synthesized stator 94B is comprised of stator poles 94Ba to 94Bm with pole-to-pole air gaps SL10. Thus, the stator 94B has a magnetic body distribution ratio MRO equalized in a circumferential periphery of the stator 94B.

In theory, setting a total skew angle (or an angle of a pole-to-pole air gap) of the stator and the rotor in a manner set for above provides a stator pole geometry that remarkably minimizes cogging torque. However, since three-dimensional flows of magnetic fluxes (hereinafter referred to "flowing-around magnetic fluxes") coming from the both axial ends of each stator pole appear in actual practice, an analysis demonstrates that the stator may preferably have a skew angle slightly less than a theoretical value. The amount of reduction in skew angle depends on a width of a pole-to-pole non-magnetic portion along a circumferential periphery of the stator and takes an angle equivalent to 0 to 100% of such a width.

Figure 18A:
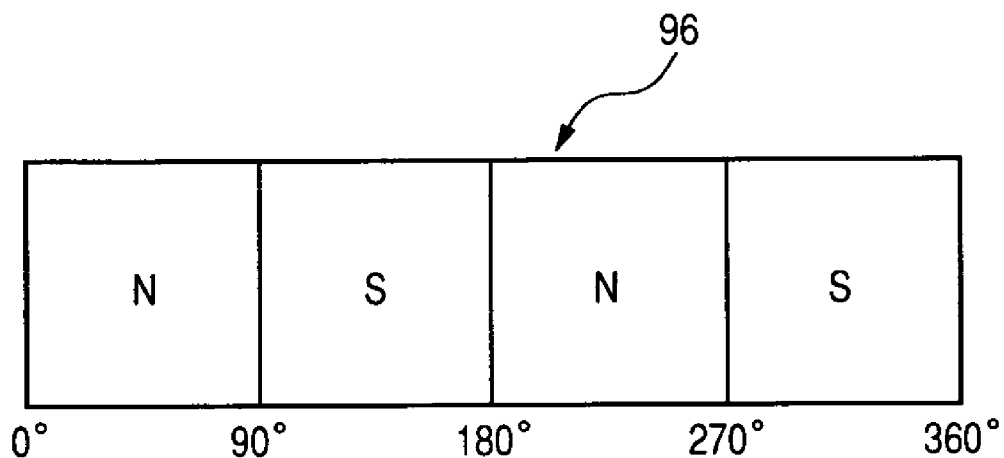
FIG. 18A is a development view of a rotor of an electric motor of a thirteenth embodiment according to the present invention.
Figure 18B:
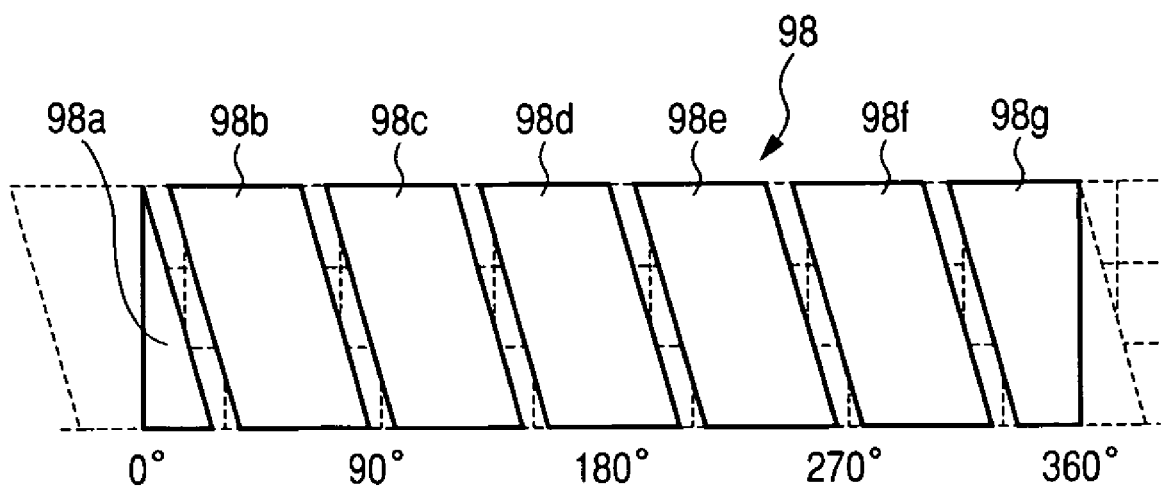
FIG. 18B is a development view of a stator obtained by carrying out the method of determining a stator pole geometry according to the present invention.

FIGS. 18A and 18B show an electric motor in a modified form with a three-phase and four electrodes in six slots. The electric motor includes a rotor 96 and a stator 98 including stator poles 98a to 98g equidistantly spaced from each other by an air gap Ag1 along the circumferential periphery of the stator 98. With the structure shown in FIGS. 18A and 18B, since S=3, the stator 98 may be preferably skewed at an electric angle of 60 degrees and a mechanical angle of 30 degrees and, in theory, the stator 98 has a magnetic body distribution ratio equalized in the circumferential periphery of the stator 98. However, the stator 98 shown in FIG. 18B has the pole-to-pole air gap Ag1 angled by a mechanical angle of 8 degrees and, hence, a mechanical angle of 0 to 8 degrees and an electric angle of 0 to 16 degrees may be preferably subtracted from the total skew angle. With the stator pole geometry shown in FIG. 18B, the stator 90 includes the stator pole pieces 98a to 98g that are skewed by an angle of 52 degrees by subtracting an electrical angle of 8 degrees.

Further, another alternative may be possible to have a stator pole geometry with such a structure mentioned above wherein magnetic flux equalizing elements, composed of magnetic body segments and non-magnetic body segments, are additionally incorporated for minimizing a difference in magnetic reluctance caused by other factors than variation in a magnetic body distribution ratio, resulting in a further remarkable reduction in cogging torque.

Furthermore, the present invention may have applications to all kinds of electric motors, employing magnets, regardless of the number of phases, the number of poles, the number of slots, a type of a rotor, an inner rotor/outer rotor and a radial type/axial type. Also, since torque of the electric motor during a conductive state includes a synthesized result of cogging torque during a non-conductive state and torque during the conductive state, the application of the present invention enables reduction in torque ripple.

Moreover, although an electric motor with a loop-shaped stator winding, proposed in Japanese Patent Application No. 2003-378403, is susceptible to have increased cogging torque due to an inherent magnetic pole structure of a stator, using a method of the present invention enables further reduction in cogging torque.

Figure 19A:
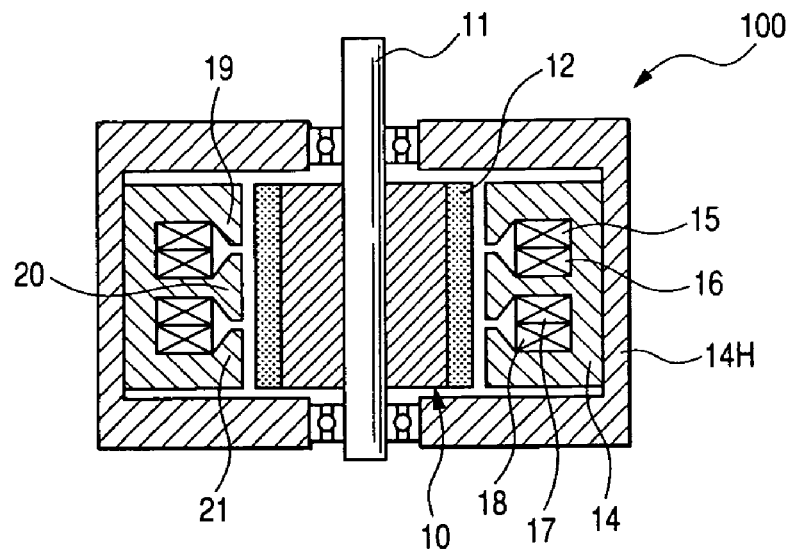
FIG. 19A is a transverse cross-sectional view showing a concrete structure of an electric motor with loop-shaped stator windings to which the present invention is applied.
Figure 19B:
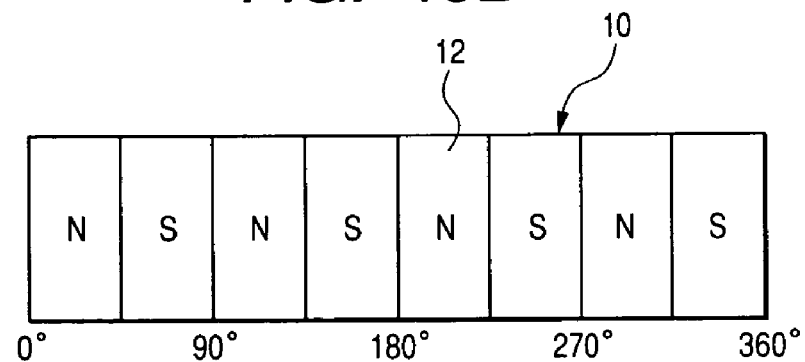
FIG. 19B is a development view of a rotor of the electric motor shown in FIG. 19A.
Figure 19C:
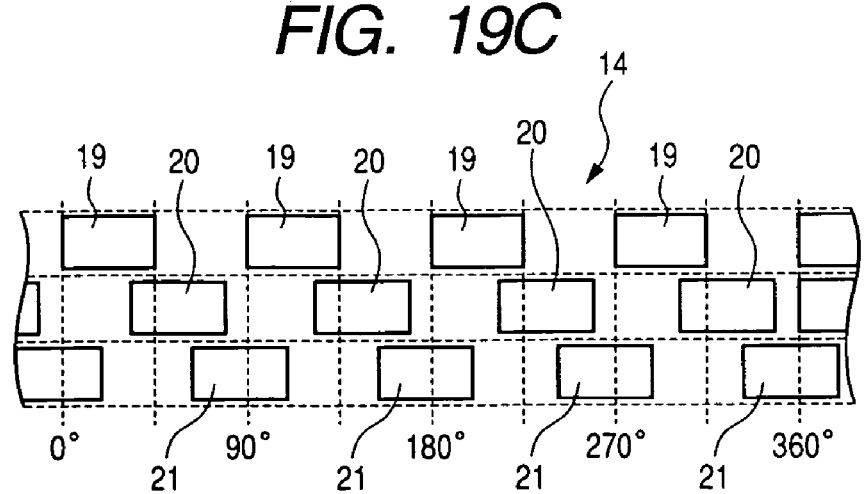
FIG. 19C is a development view showing stator poles of the motor shown in FIG. 19A.
Figure 19D:
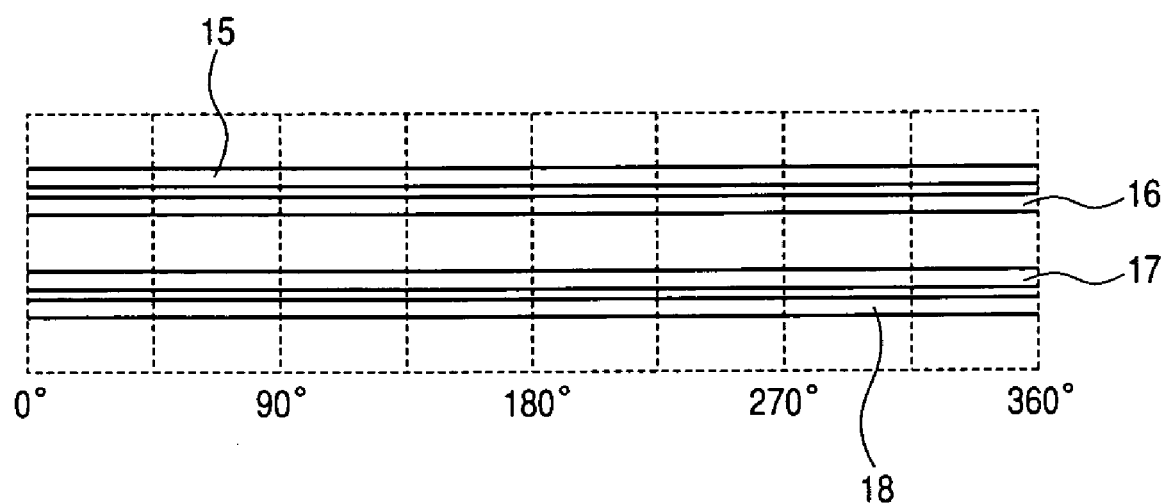
FIG. 19D is a development view showing stator windings in respective phases of the motor shown in FIG. 19A.

FIG. 19A is a cross-sectional view showing a concrete structure of an electric motor having a loop-shaped stator winding. The electric motor 200, shown in FIG. 19A, includes a three-phase alternating current motor that is comprised of a rotor 10, having an outer periphery carrying thereon a plurality of permanent magnets 12 in 8 poles, and a stator 14. The rotor 10 has a rotor shaft 11 that is rotatably supported by a stator housing 14H. The permanent magnets 12 have N-poles and S-poles that are alternately disposed on a circumferential periphery of the rotor 10. FIG. 19B is a development view showing the rotor 10 developed in a circumferential direction. FIG. 19C shows a structure of the stator 14 in a development view. As shown in FIG. 19B, the stator 14 includes four U-phase stator poles 19, four V-phase stator poles 20 and four W-phase stator poles 21. The stator poles 19, 20, 21 have salient shapes that have inner peripheries facing the rotor 10. A loop-shaped U-phase winding 15, V-phase windings 16, 17 and a W-phase winding 18 are disposed in association with the U-phase stator poles 19, the V-phase stator poles 20 and the W-phase stator poles 21. FIG. 19D is a circumferential development view of the winding in each phase. With such an exemplary structure, although a fundamental configuration with no skews in both the rotor and the stator has been shown, the present invention is not limited to such a structure and may take the form of a structure additionally including non-magnetic body segments and magnetic body segments for enabling reduction in cogging torque. For instance, magnetic circuits can be easily structured not only in the electric motor of the skew type shown in FIG. 3A but also in the stators of the shapes, shown in FIGS. 6A and 9A, whose fabrication is hard because of a normal electric motor premised on two-dimensional flow of magnetic fluxes.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. An electric motor comprising:
a stator having a circumferential periphery on which a plurality of stator poles are disposed at circumferentially spaced intervals, each of the stator poles including a magnetic body segment extending along an axis of the stator and a non-magnetic body segment; and
a rotor rotatable in face-to-face relationship with the stator and having an outer periphery facing the circumferential periphery of the stator, wherein
the stator includes magnetic reluctance equalizing means associated with the stator poles, respectively, and
the magnetic reluctance equalizing means include the magnetic body segments and the non-magnetic body segments disposed in axial ends of the magnetic body segments at areas minimizing variation in magnetic body ratios of the magnetic body segments along the circumferential periphery of the stator to minimize a difference in magnetic reluctance along the circumferential periphery of the stator.

2. The electric motor according to claim 1, wherein:
the plurality of stator poles carry thereon concentrated windings in various phases;
the number S of phases is an odd number; and
the stator and the rotor have a total skew angle that lies at an electric angle of substantially 360/(2S) degrees;
wherein the magnetic reluctance equalizing means comprise non-magnetic segments axially extending through pole-to-pole air gaps adjacent to the stator poles, respectively, each with substantially the same width as the pole-to-pole air gap and at substantially the same skew angle of the stator pole.

3. The electric motor according to claim 1, wherein:
the stator poles are skewed at given angles, respectively; and
the magnetic reluctance equalizing means include non-magnetic body segments partially incorporated in the stator poles, respectively.

4. The electric motor according to claim 1, wherein:
the stator poles are skewed at given angles, respectively; and
the magnetic reluctance equalizing means include magnetic body segments disposed in side areas adjacent to the stator poles, respectively.

5. The electric motor according to claim 1, wherein:
the stator poles include nonidentical stator poles arranged in the circumferential periphery of the stator; and the magnetic reluctance equalizing means include the non-magnetic body segments alternately disposed in axial ends of the stator poles at areas having high magnetic distribution ratios, respectively, such that the stator has minimized variation in the magnetic body ratios of the magnetic body segments along the circumferential periphery of the stator.

6. The electric motor according to claim 1, wherein:

the stator poles include nonidentical stator poles arranged in the circumferential periphery of the stator; and the magnetic reluctance equalizing means include the magnetic body segments alternately disposed in side areas adjacent to axial ends of the stator poles, respectively.

7. The electric motor according to claim 1, wherein:

the stator poles include nonidentical stator poles arranged in the circumferential periphery of the stator; and the magnetic reluctance equalizing means include the magnetic body segments disposed in a first group of the stator poles, respectively, and the non-magnetic body segments disposed in a second group of the stator poles so as to minimize the difference in magnetic reluctance along the circumferential periphery of the stator.

8. The electric motor according to claim 1, wherein:

each of the non-magnetic body segments takes the form of an air gap.

9. The electric motor according to claim 1, wherein:

the plurality of stator poles carry thereon concentrated windings in various phases;

the number S of phases is an odd number; and the stator and the rotor have a total skew angle that lies at an electric angle of substantially $360/(2S)$ degrees.

10. The electric motor according to claim 1, wherein:

the plurality of stator poles carry thereon concentrated windings in various phases;

the number S of phases is an odd number; and the stator has an iron-to-iron air gap equivalent to a value of a case wherein the stator and the rotor has a total skew angle that lies at an electric angle of substantially $360/(2S)$ degrees.

11. The electric motor according to claim 1, wherein:

the plurality of stator poles carry thereon concentrated windings in various phases;

the number S of phases is an odd number; and the stator and the rotor have a total skew angle that lies in a value derived by subtracting an angle corresponding to 0% to 100% of the non-magnetic body segments along the circumferential periphery of the stator from an electric angle of substantially $360/(2S)$ degrees.

12. The electric motor according to claim 1, wherein:

the plurality of stator poles carry thereon concentrated windings in various phases;

the number S of phases is an odd number; and the stator has an iron-to-iron air gap equivalent to a value derived by subtracting an angle corresponding to 0% to 100% of the non-magnetic body segments along the circumferential periphery of the stator from an electric angle of substantially $360/(2S)$ degrees.

13. The electric motor according to claim 1, wherein:

the magnetic reluctance equalizing means comprise a first group of non-magnetic segments and a second group of non-magnetic segments associated with the stator poles, respectively, at symmetric positions with respect to a center point of the stator.

* * * * *